(12) United States Patent
Nakanishi

(10) Patent No.: US 8,542,350 B2
(45) Date of Patent: Sep. 24, 2013

(54) OPTICAL POSITION DETECTION DEVICE AND DISPLAY DEVICE WITH POSITION DETECTION FUNCTION

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 382 days.

(21) Appl. No.: 12/877,369

(22) Filed: Sep. 8, 2010

(65) Prior Publication Data

US 2011/0096322 A1   Apr. 28, 2011

(30) Foreign Application Priority Data

Oct. 26, 2009   (JP) ................................. 2009-245195

(51) Int. Cl.
*G01J 3/00*     (2006.01)
*G01B 11/14*    (2006.01)

(52) U.S. Cl.
USPC ............................................ 356/51; 356/614

(58) Field of Classification Search
None
See application file for complete search history.

(56) References Cited

U.S. PATENT DOCUMENTS

| 5,009,501 | A * | 4/1991 | Fenner et al. ............... 356/141.3 |
| 5,317,140 | A * | 5/1994 | Dunthorn ...................... 250/221 |
| 8,259,309 | B2 * | 9/2012 | Kiyose ........................... 356/614 |
| 8,348,434 | B2 * | 1/2013 | Nakanishi ........................ 353/70 |
| 8,378,288 | B2 * | 2/2013 | Kiyose ........................... 250/221 |
| 8,400,642 | B2 * | 3/2013 | Nakanishi ...................... 356/621 |
| 8,411,289 | B2 * | 4/2013 | Takahashi ...................... 356/623 |
| 2008/0316324 | A1 * | 12/2008 | Rofougaran et al. ...... 348/222.1 |
| 2009/0251685 | A1 * | 10/2009 | Bell ................................ 356/51 |

FOREIGN PATENT DOCUMENTS

JP   2001-142643   5/2001

* cited by examiner

*Primary Examiner* — Gordon Stock, Jr.
(74) *Attorney, Agent, or Firm* — Harness, Dickey & Pierce, P.L.C.

(57) ABSTRACT

A position detector detecting an object's position includes: first, second and third light sources emitting first, second and third position detection light beams to form first, second and third intensity distributions in a detection area, a highest intensity portion of the second intensity distribution being shifted from that of the first intensity distribution, a highest intensity portion of the third intensity distribution being shifted from a straight line connecting the highest intensity portions of the first and second intensity distributions; a light detector detecting the first, second and third position detection light beams reflected by the object; and a position detection section detecting a two-dimensional coordinate of the object in a detection plane set in the detection area by comparing the intensities of the first and second position detection light beams, and comparing the intensities of the second and third position detection light beams.

13 Claims, 16 Drawing Sheets

OPTICAL POSITION DETECTION DEVICE AND DISPLAY DEVICE WITH POSITION DETECTION FUNCTION

BACKGROUND

1. Technical Field

The present invention relates to an optical position detection device and a display device with a position detection function capable of optically detecting a position of an object matter in a detection area.

2. Related Art

For electronic devices such as cellular phones, car navigation systems, personal computers, ticket-vending machines, or banking terminals, there are used in recent years display devices with a position detection function each having a touch panel disposed on the front of an image generation device such as a liquid crystal device, and in such display devices with a position detection function, information is input with reference to an image displayed on the image generation device. Such touch panels are each configured as a position detection device for detecting a position of an object matter in a detection area (see, e.g., FIG. 6 of JP-A-2001-142643).

The position detection device described in the document mentioned above is of an optical type, and has a configuration of setting a detection area on the side of the display surface for displaying an image in the direct view display device, and having a plurality of light emitting diodes and a plurality of photo transistors disposed on both sides across the detection area. In such a position detection device, if the object matter enters inside the detection area, the light is blocked by the object matter, and therefore, by identifying the photo transistors the light to which is blocked, the position of the object matter can be detected.

However, in the optical position detection device described in the document mentioned above, it is required to dispose a number of light emitting diodes and the photo transistors corresponding to the resolution of the position coordinate to be detected around the detection area, which is impracticable.

SUMMARY

An advantage of some aspects of the invention is to provide an optical position detection device and a display device with a position detection function capable of optically detecting the position of the object matter without disposing a number of light sources and light detectors around the detection area.

According to an aspect of the invention, there is provided an optical position detection device adapted to detect a position of an object matter in a detection area, including a first light source adapted to emit a first position detection light beam to the detection area to form a first intensity distribution of the first position detection light beam in the detection area, a second light source adapted to emit a second position detection light beam to the detection area to form a second intensity distribution in the detection area, the second intensity distribution having a highest intensity portion at a position shifted from a highest intensity portion of the first intensity distribution, a third light source adapted to emit a third position detection light beam to the detection area to form a third intensity distribution in the detection area, the third intensity distribution having a highest intensity portion at a position shifted from an imaginary straight line connecting the highest intensity portion of the first intensity distribution and the highest intensity portion of the second intensity distribution, a light detector adapted to detect the first position detection light beam, the second position detection light beam, and the third position detection light beam, reflected by the object matter in the detection area, and a position detection section adapted to detect a two-dimensional coordinate of the object matter in a detection plane set in the detection area, based on a result of comparison between an intensity of the first position detection light beam received by the light detector and an intensity of the second position detection light beam received by the light detector, and a result of comparison between an intensity of the second position detection light beam received by the light detector and an intensity of the third position detection light beam received by the light detector.

In this aspect of the invention, the position detection light beams (the first position detection light beam, the second position detection light beam, the third position detection light beam) are emitted from the first light source, the second light source, and the third light source to the detection area to form the intensity distributions of the position detection light beams in the detection area, and the position detection light beams reflected by the object matter in the detection area are detected by the light detector. Therefore, the position of the object matter can be detected optically without disposing a number of light sources and light detectors around the detection area. Here, the first position detection light beam with the first intensity distribution, the second position detection light beam with the second intensity distribution having the highest intensity portion at a position shifted from the highest intensity portion of the first intensity distribution, and the third position detection light beam with the third intensity distribution having the highest intensity portion at a position shifted from an imaginary straight line connecting the highest intensity portion of the first intensity distribution and the highest intensity portion of the second intensity distribution are emitted to the detection area as the position detection light beams. Therefore, by using the two position detection light beams out of the first position detection light beam, the second position detection light beam, and the third position detection light beam, and two position detection light beams of another combination, the position detection section can detect the position of the object matter in the imaginary plane intersecting in the emission directions of the position detection light beams based on the reception result of the light detector. In other words, by comparing the detection result of the first position detection light beam reflected by the object matter in the light detector and the detection result of the second position detection light beam reflected by the object matter in the light detector with each other, the ratio of the distance from the highest intensity portion of the first intensity distribution to the object matter and the distance from the highest intensity portion of the second intensity distribution to the object matter can be obtained. Further, by comparing the detection result of the second position detection light beam reflected by the object matter in the light detector and the detection result of the third position detection light beam reflected by the object matter in the light detector with each other, the ratio of the distance from the highest intensity portion of the second intensity distribution to the object matter and the distance from the highest intensity portion of the third intensity distribution to the object matter can be obtained. Therefore, the position corresponding to these ratios can be detected as the position of the object matter. Therefore, the two-dimensional coordinate of the object matter can be detected optically with a relatively simple configuration.

In this aspect of the invention, it is preferable that in each of the first intensity distribution, the second intensity distribution, and the third intensity distribution, the intensity decreases monotonically as distance from the highest intensity portion increases. According to the configuration described above, since the relationship between the position of the object matter and the intensity of the light received in the light detector becomes relatively simple, the position of the object matter can be detected with good accuracy with a relatively simple process.

In this aspect of the invention, it is preferable that the first light source, the second light source, and the third light source emit the first position detection light beam, the second position light beam, and the third position detection light beam at respective timing different from each other. In another aspect of the invention, it is possible to emit the first position detection light beam, the second position detection light beam, and the third position light beam simultaneously if the wavelengths of the first position detection light beam, the second position light beam, and the third position detection light beam are made different from each other. In this case, it is required to use the light detector for selectively detecting the first position detection light beam, the second position detection light beam, and the third position detection light beam. However, since the first position detection light beam, the second position detection light beam, and the third position detection light beam can be detected by the same light detector by emitting the first position detection light beam, the second position detection light beam, and the third position detection light beam at respective timing different from each other, simplification of the configuration can be achieved.

In this aspect of the invention, it is preferable that the position detection light beams are made of infrared light. According to the configuration described above, there can be obtained an advantage that the position detection light beams become invisible.

In this aspect of the invention, it is preferable that the first light source, the second light source, and the third light source emit the first position detection light beam, the second position detection light beam, and the third position detection light beam as diverging light beams. By adopting the configuration described above, the position corresponding to the light axis becomes the highest intensity portion of the intensity distribution, and the intensity distribution in which the intensity is reduced monotonically as the distance from the highest intensity portion increases can be used.

In this aspect of the invention, it is possible to adopt the configuration in which the first light source, the second light source, and the third light source are disposed with light axes oriented toward the detection area.

In this aspect of the invention, it is also possible to adopt a configuration in which a light guide plate having a light emitting surface facing to the detection area is further provided, and the first position detection light beam, the second position detection light beam, and the third position detection light beam are emitted to the detection area via the light guide plate.

In this aspect of the invention, it is preferable to include a fourth light source adapted to emit a fourth position detection light beam to form a intensity distribution, in which the intensity varies in a Z-axis direction perpendicular to the X-Y plane, together with the first position detection light beam, the second position detection light beam, and the third position detection light beam. By adopting the configuration described above, a three-dimensional coordinate of the object matter can be detected.

The optical position detection device to which the invention is applied can be used for the display device with a position detection function, and the display device with a position detection function is preferably provided with an image generation device for forming an image in an area overlapping the detection area. As the image generation device described above, a projection display device or a direct view display device such as a liquid crystal device or an organic electroluminescence device can be used. Such a display device with a position detection function is used for an electronic device such as a cellular phone, a car navigation system, a personal computer, a ticket-vending machine, or a banking terminal besides various types of display devices.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
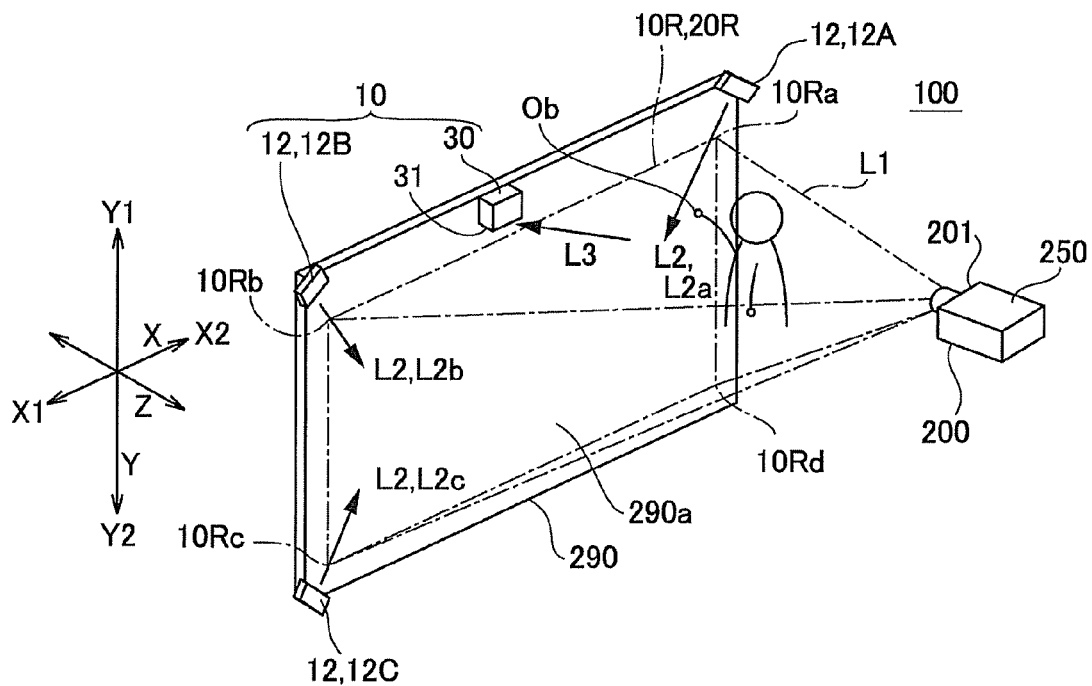
FIGS. 1A and 1B are explanatory diagrams schematically showing a configuration of an optical position detection device and a display device with a position detection function according to a first embodiment of the invention.

Hereinafter, some embodiments of the invention will be explained in detail with reference to the accompanying drawings. It should be noted that in the explanation described below it is assumed that X-axis, Y-axis, and Z-axis intersect with each other, and images are projected in a direction along the Z-axis. Further, in the drawings referred to below, things are displayed with the X-axis oriented in the lateral direction, and the Y-axis oriented in the vertical direction for the sake of convenience of explanation. Further, in the drawings referred to below, things are shown assuming one side of the X-axis direction as an X1 side, the other side thereof as an X2 side, one side of the Y-axis direction as a Y1 side, and the other side thereof as a Y2 side. Further, in the drawings referred to in the description below, the scale ratios of the members are set differently in order to illustrate the members with sizes which can be recognized in the drawings.

First Embodiment

Overall Configuration of Display Device with Position Detection Function

Figure 1B:
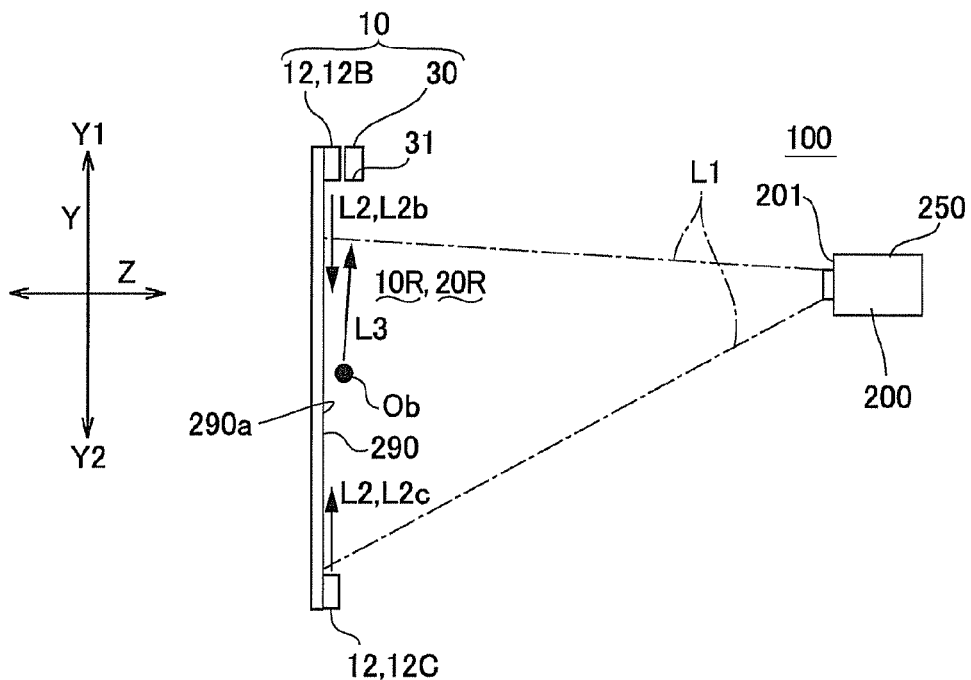

FIGS. 1A and 1B are explanatory diagrams schematically showing a configuration of an optical position detection device and a display device with a position detection function according to a first embodiment of the invention, wherein FIG. 1A is an explanatory diagram schematically showing an appearance of a substantial part of the display device with a position detection function viewed from obliquely above, and FIG. 1B is an explanatory diagram schematically showing an appearance thereof viewed from a lateral side.

The display device 100 with a position detection function shown in FIGS. 1A and 1B is configured as a projection display device provided with an image projection device 200 (an image generation device) called a liquid crystal projector or a digital micromirror device, and a screen member 290. The image projection device 200 projects an image display light beam L1 in an enlarged manner from a projection lens system 210 provided to a front face section 201 of a housing 250 toward the screen member 290.

The display device 100 with a position detection function according to the present embodiment is provided with an optical position detection device 10, and the optical position detection device 10 is provided with a function of optically detecting the position of an object matter Ob in a detection area 10R set on the side of a screen surface 290a (in front of the screen member 290) on which images are viewed in the screen member 290. In the present embodiment, the detection area 10R is an area having a rectangular shape viewed in the normal line direction with respect to the screen member 290, and overlaps an area (an image display area 20R) to which the image is projected by the image projection device 200 in the screen member 290. The optical position detection device 10 according to the present embodiment detects the position (the X-coordinate and the Y-coordinate) of the object matter Ob in the X-Y plane (the detection plane) parallel to the screen member 290 in the detection area 10R. Therefore, the display device 100 with a position detection function according to the present embodiment treats, for example, the result of detection of the X, Y coordinates of the object matter Ob in the optical position detection device 10 as, for example, input information for designating, for example, a part of the image thus projected, and performs, for example, switching of the image based on the input information.

Configuration of Position Detection Device

Figure 2:
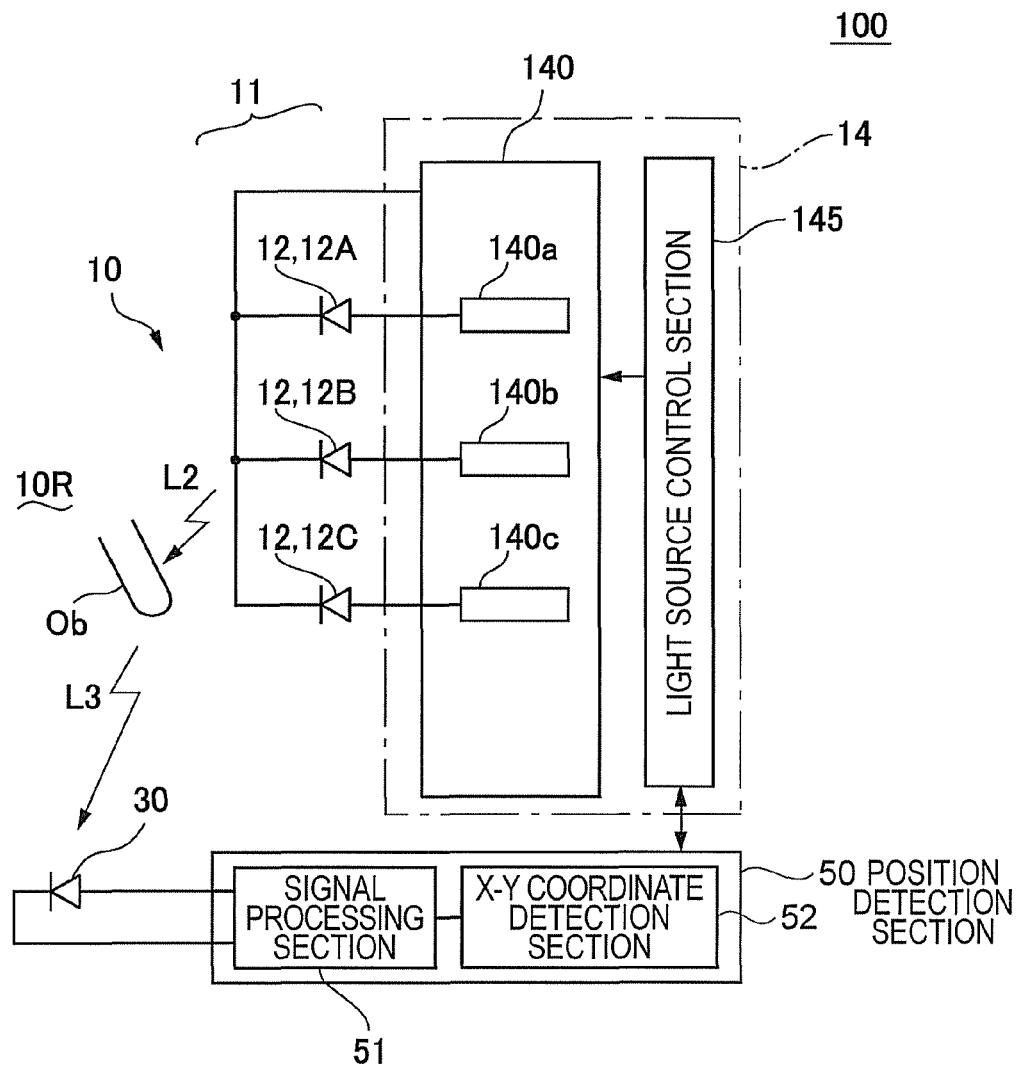
FIG. 2 is an explanatory diagrams showing an electrical configuration of an optical position detection device used in the display device 100 with a position detection function according to the first embodiment of the invention.

FIG. 2 is an explanatory diagrams showing an electrical configuration of the optical position detection device used in the display device 100 with a position detection function according to the first embodiment of the invention.

The optical position detection device 10 according to the present embodiment is provided with three light emitting elements 12 (a first light emitting element 12A, a second light emitting element 12B, and a third light emitting element 12C) each for emitting a position detection light beam to the detection area 10R, and a light detector 30 for detecting a position detection light beams L3 reflected by the object matter Ob in the detection area 10R. In the present embodiment, the three light emitting elements 12 each have the light axis oriented toward the direction along the screen surface 290a in the direction of the side of the detection area 10R on the side of the screen surface 290a of the screen member 290. Therefore, a position detection light beams L2 emitted from the respective light emitting elements 12 proceed along the screen surface 290a.

The three light emitting elements 12 have the light axes respectively oriented toward three corner portions 10Ra, 10Rb, and 10Rc out of the four corner portions 10Ra through 10Rd of the detection area 10R. More specifically, the first light emitting element 12A has the light axis oriented toward the corner portion 10Ra of the detection area 10R, and emits a first position detection light beam L2a to the detection area 10R from the side of the corner portion 10Ra. The second light emitting element 12B has the light axis oriented toward the corner portion 10Rb of the detection area 10R, and emits a second position detection light beam L2b to the detection area 10R from the side of the corner portion 10Rb. The third light emitting element 12C has the light axis oriented toward the corner portion 10Rc of the detection area 10R, and emits a third position detection light beam L2c to the detection area 10R from the side of the corner portion 10Rc.

The light emitting elements 12 are each formed of a light emitting diode (LED) or the like, and each discharge the position detection light beams L2 as diverging light beams formed of infrared light. In other words, since the position detection light beams L2 each preferably have a wavelength range efficiently reflected by the object matter Ob such as a finger or a stylus pen, if the object matter Ob is a human body such as a finger, the position detection light beams L2 are preferably infrared light beams (in particular near infrared light beams with a wavelength of, for example, around 850 nm or 950 nm) having high reflectance on a surface of a human body. In the present embodiment, either of the light emitting elements 12 emits an infrared light beam having a peak wavelength in the wavelength band around 850 nm.

The light detector 30 is formed of a light receiving element such as a photodiode or a phototransistor, and is disposed on the side of the screen surface 290a of the screen member 290 and outside the detection area 10R having a light receiving section 31 oriented in the direction along the screen surface 290a.

As shown in FIG. 2, the optical position detection device 10 includes a light source drive section 14 for driving the light emitting elements 12 (the first light emitting element 12A, the second light emitting element 12B, and the third light emitting element 12C), and a position detection section 50 to which the detection result is output from the light detector 30. The light source drive section 14 is provided with a light source drive circuit 140 for driving the light emitting elements 12 and a light source control section 145 for controlling the emission intensity of each of the plurality of light emitting elements 12 via the light source drive circuit 140. The light source drive circuit 140 is provided with a light source drive circuit 140a for driving the first light emitting element 12A as a first light source, a light source drive circuit 140b for driving the second light emitting element 12B as a second light source, and a light source drive circuit 140c for driving the third light emitting element 12C as a third light source. The light source control section 145 controls the light emitting elements 12 via the light source drive circuits 140a through 140c.

The position detection section 50 is provided with a signal processing section 51 and an X-Y coordinate detection section 52, and detects the position of the object matter Ob based on the detection result in the light detector 30. The light source control section 145 and the position detection section 50 are connected to each other with a signal line, and the drive of the light emitting elements 12 and the detection operation in the position detection section 50 are performed in conjunction with each other.

Configuration of Intensity Distribution of Position Detection Light Beam L2

Figure 3A:
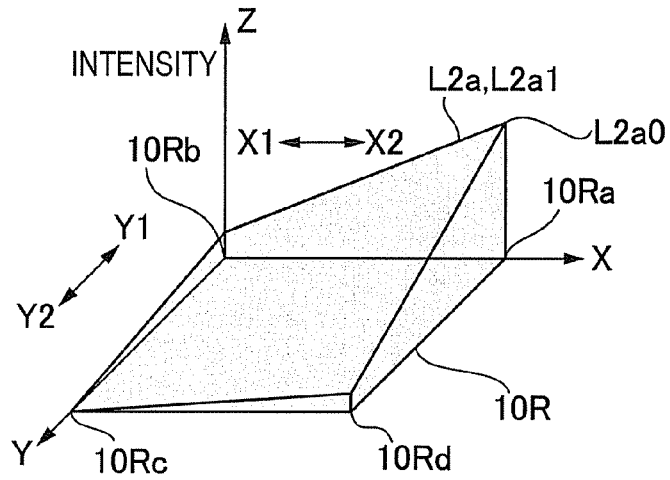
FIGS. 3A through 3C are explanatory diagrams of an intensity distribution of position detection light used in the optical position detection device according to the first embodiment of the invention.
Figure 3B:
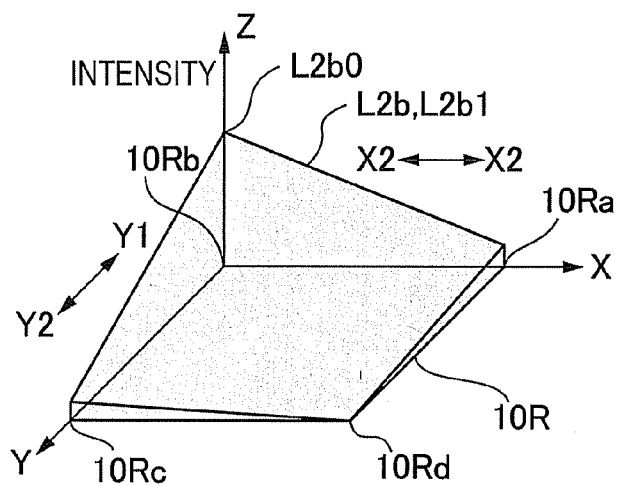
Figure 3C:
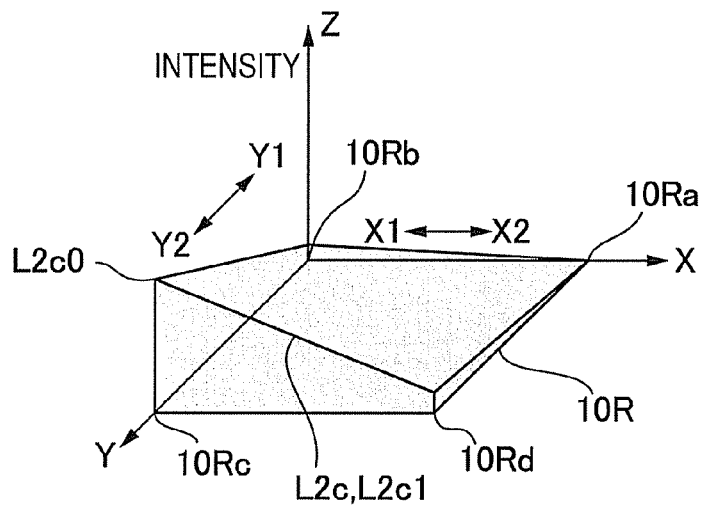

FIGS. 3A through 3C are explanatory diagrams of the intensity distributions of the position detection light beams used in the optical position detection device 10 according to the first embodiment of the invention, wherein FIG. 3A is an explanatory diagram of a first intensity distribution formed by the first position detection light beam, FIG. 3B is an explanatory diagram of a second intensity distribution formed by the second position detection light beam, and FIG. 3C is an explanatory diagram of a third intensity distribution formed by the third position detection light beam.

In the optical position detection device 10 according to the present embodiment, the first light emitting element 12A, the second light emitting element 12B, and the third light emitting element 12C are disposed at positions facing the corner portions 10Ra, 10Rb, and 10Rc of the detection area 10R, and have light axes oriented toward the corner portions 10Ra, 10Rb, and 10Rc, respectively. Further, the first position detection light beam L2a emitted from the first light emitting element 12A, the second position detection light beam L2b emitted from the second light emitting element 12B, and the third position detection light beam L2c emitted from the third light emitting element 12C are all diverging light beams, and in these diverging light beams the intensity is the highest in the vicinities of light axes L12a, L12b, and L12c, and is continuously lowered as the distances from the light axes L12a, L12b, and L12c increase. Further, in the first position detection light beam L2a, the second position detection light beam L2b, and the third position detection light beam L2c, the intensity thereof continuously decreases as the distances from the first light emitting element 12A, the second light emitting element 12B, and the third light emitting element 12C increase, respectively.

Therefore, the first position detection light beam L2a emitted from the first light emitting element 12A forms a first intensity distribution L2a1 shown in FIG. 3A in the detection area 10R. In the first intensity distribution L2a1, a highest intensity portion L2a0 of the first intensity distribution L2a1 appears in the corner portion 10Ra, and the intensity decreases monotonically as the distance from the highest intensity portion L2a0 increases. In the first intensity distribution L2a1 according to the present embodiment, the intensity decreases linearly or substantially linearly as the distance from the highest intensity portion L2a0 increases. Further, the second position detection light beam L2b emitted from the second light emitting element 12B forms a second intensity distribution L2b1 shown in FIG. 3B in the detection area 10R. In the second intensity distribution L2b1, a highest intensity portion L2b0 of the second intensity distribution L2b1 appears in the corner portion 10Rb, and the intensity decreases monotonically as the distance from the highest intensity portion L2b0 increases. In the second intensity distribution L2b1 according to the present embodiment, the intensity decreases linearly or substantially linearly as the distance from the highest intensity portion L2b0 increases. Further, the third position detection light beam L2c emitted from the third light emitting element 12C forms a third intensity distribution L2c1 shown in FIG. 3C in the detection area 10R. In the third intensity distribution L2c1, a highest intensity portion L2c0 of the third intensity distribution L2c1 appears in the corner portion 10Rc, and the intensity decreases monotonically as the distance from the highest intensity portion L2c0 increases. In the third intensity distribution L2c1 according to the present embodiment, the intensity decreases linearly or substantially linearly as the distance from the highest intensity portion L2c0 increases.

Here, the highest intensity portion L2a0 of the first intensity distribution L2a1 and the highest intensity portion L2b0 of the second intensity distribution L2b1 are shifted from each other in the X-axis direction. Further, the highest intensity portion L2c0 of the third intensity distribution L2c1 is located at a position not overlapping an imaginary line connecting the highest intensity portion L2b0 of the second intensity distribution L2b1 and the highest intensity portion L2a0 of the first intensity distribution L2a1. In other words, the highest intensity portion L2a0 of the first intensity distribution L2a1, the highest intensity portion L2b0 of the second intensity distribution L2b1, and the highest intensity portion L2c0 of the third intensity distribution L2c1 are located respectively at the corner portions of an imaginary triangle. Therefore, the first intensity distribution L2a1, the second intensity distribution L2b1, and the third intensity distribution L2c1 have intensity gradients with respective directions different from each other.

Fundamental Principle of Coordinate Detection

In the display device 100 with a position detection function according to the present embodiment, the light emitting elements 12 are lit in a position detection light source section 11 to form the intensity distributions of the position detection light beams L2 in the detection area 10R, and at the same time, the position detection light beams L2 reflected by the object matter Ob are detected with the light detector 30, and then the position detection section 50 detects the position of the object matter Ob in the detection area 10R based on the detection result in the light detector 30. Therefore, the principle of the coordinate detection will be explained with reference to FIGS. 4A and 4B.

Figure 4A:
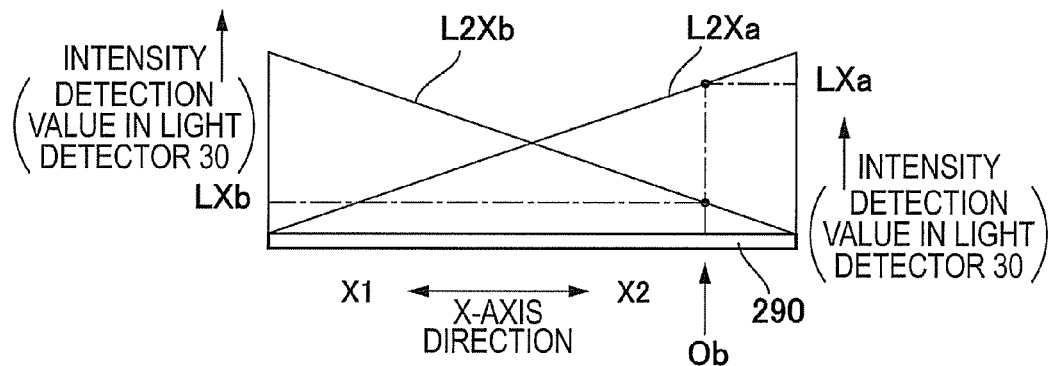
FIGS. 4A and 4B are explanatory diagrams schematically showing the principle of the optical position detection device of the display device with a position detection function according to the first embodiment of the invention.
Figure 4B:
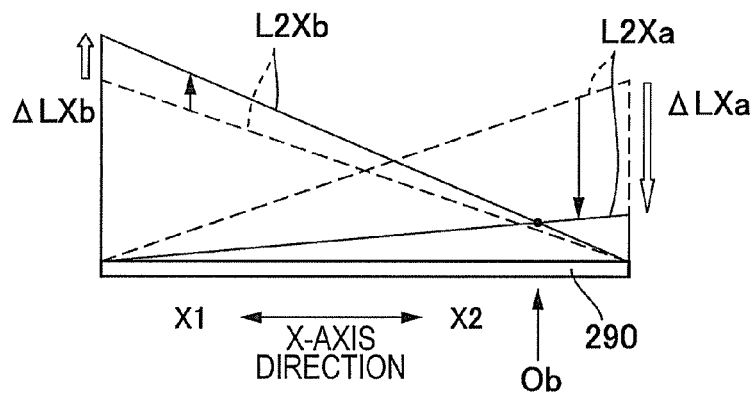

FIGS. 4A and 4B are explanatory diagrams schematically showing the principle of the optical position detection device 10 of the display device 100 with a position detection function according to the first embodiment of the invention, wherein FIG. 4A is an explanatory diagram showing the intensity of the position detection light beam reflected by the object matter, and FIG. 4B is an explanatory diagram showing how the intensity distributions of the position detection light beams are adjusted so that the intensities of the position detection light beams reflected by the object matter become equal to each other.

In the display device 100 with a position detection function according to the present embodiment, when the first light emitting element 12A and the second light emitting element 12B in the position detection light source section 11 are lit sequentially to emit the first position detection light beam L2a and the second position detection light beam L2b, the first intensity distribution L2a1 and the second intensity distribution L2b1 shown in FIGS. 4A and 4B are formed sequentially. In the explanation presented below, since the highest intensity portion L2a0 of the first intensity distribution L2a1 and the highest intensity portion L2b0 of the second intensity distribution L2b1 are identical in the position in the Y-axis direction, and shifted from each other in the X-axis direction, it is assumed that the component in the X-axis direction in the first intensity distribution L2a1 is a first X-coordinate detection intensity distribution L2Xa, and the component in the X-axis direction in the second intensity distribution L2b1 is a second X-coordinate detection intensity distribution L2Xb.

In order to detect the position in the X-axis direction (X coordinate) using the first X-coordinate detection intensity distribution L2Xa and the second X-coordinate detection intensity distribution L2Xb, firstly in a first period, the first light emitting element 12A is lit while putting off the second light emitting element 12B to thereby form the first X-coordinate detection intensity distribution L2Xa with the intensity monotonically decreasing in a direction toward one side X1 of the X-axis direction from the other side X2 thereof as shown in FIG. 4A. Subsequently, in a second period, the second light emitting element 12B is lit while putting off the first light emitting element 12A to thereby form the second X-coordinate detection intensity distribution L2Xb with the intensity monotonically decreasing from the one side X1 of the X-axis direction toward the other side X2 thereof. Therefore, when the object matter Ob is disposed in the detection area 10R, the object matter Ob reflects the first position detection light beam L2a and the second position detection light beam L2b, and the light detector 30 detects some of the reflected light beams. Here, since the first X-coordinate detection intensity distribution L2Xa formed in the first period and the second X-coordinate detection intensity distribution L2Xb formed in the second period each have a constant distribution, it is possible to detect the X-coordinate of the object matter Ob based on the detection result in the light detector 30 using the following method, for example.

For example, the X-coordinate of the object matter Ob is detected based on the adjustment value having been used when adjusting the control value (the drive current value) with respect to the light emitting elements 12 so that a detection value LXa in the light detector 30 when forming the first X-coordinate detection intensity distribution L2Xa in the first period and a detection value LXb in the light detector 30 when forming the second X-coordinate detection intensity distribution L2Xb in the second period become equal to each other. In such a method as described above, it is understood that if the detection value LXa in the light detector 30 in the first period and the detection value LXb in the light detector 30 in the second period are equal to each other, the distance from the highest intensity portion L2a0 of the first intensity distribution L2a1 to the object matter Ob and the distance from the highest intensity portion L2b0 of the second intensity distribution L2b1 to the object matter Ob shown in FIGS. 3A through 3C are equal to each other.

In contrast thereto, in the case in which the detection value LXa in the light detector 30 in the first period and the detection value LXb in the light detector 30 in the second period are different from each other, the control values (the drive current values) to the first light emitting element 12A and the second light emitting element 12B are adjusted so that the detection values LXa, LXb become equal to each other, and as shown in FIG. 4B, the first X-coordinate detection intensity distribution L2Xa is formed again in the first period, and the second X-coordinate detection intensity distribution L2Xb is formed again in the second period. If the detection value LXa in the light detector 30 in the first period and the detection value LXb in the light detector 30 in the second period become equal to each other as a result, the ratio between an adjustment value ΔLXa of the control value to the first light emitting element 12A in the first period and an adjustment value ΔLXb of the control value to the second light emitting element 12B in the second period corresponds to the ratio of the amounts of the displacement of the object matter Ob from the midpoint between the highest intensity portion L2a0 of the first intensity distribution L2a1 and the highest intensity portion L2b0 of the second intensity distribution L2b1 shown in FIGS. 3A and 3B. Further, the ratio between the control value to the first light emitting element 12A in the first period and the control value to the second light emitting element 12B in the second period when the detection value LXa in the light detector 30 in the first period and the detection value LXb in the light detector 30 in the second period become equal to each other corresponds to the ratio of the distance from the highest intensity portion L2a0 of the first intensity distribution L2a1 to the object matter Ob and the distance from the highest intensity portion L2b0 of the second intensity distribution L2b1 to the object matter Ob shown in FIGS. 3A and 3B. Therefore, since the ratio between the distance from the highest intensity portion L2a0 of the first intensity distribution L2a1 to the object matter Ob and the distance from the highest intensity portion L2b0 of the second intensity distribution L2b1 to the object matter Ob can be obtained, the X-coordinate of the object matter Ob can be detected.

It should be noted that in the case in which the detection value LXa in the light detector 30 in the first period and the detection value LXb in the light detector 30 in the second period are different from each other, it is also possible to, for example, reduce the control value to the first light emitting element 12A in the first period as much as the adjustment value ΔLXa, or alternatively increase the control value to the second light emitting element 12B in the second period as much as the adjustment value ΔLXb. If, in consequence, the detection value LXa in the light detector 30 in the first period and the detection value LXb in the light detector 30 in the second period become equal to each other, the ratio between the control value to the first light emitting element 12A in the first period after adjusting the control value and the control value to the second light emitting element 12B in the second period after adjusting the control value corresponds to the ratio between the distance from the highest intensity portion L2a0 of the first intensity distribution L2a1 to the object matter Ob and the distance from the highest intensity portion L2b0 of the second intensity distribution L2b1 to the object matter Ob shown in FIGS. 3A and 3B. Therefore, since the ratio between the distance from the highest intensity portion L2a0 of the first intensity distribution L2a1 to the object matter Ob and the distance from the highest intensity portion L2b0 of the second intensity distribution L2b1 to the object matter Ob can be obtained, the X-coordinate of the object matter Ob can be detected.

In either of the cases of adopting the respective methods described above, by performing the process described above by sequentially lighting the light emitting elements 12 distant from each other in the Y-axis direction such as the second light emitting element 12B and the third light emitting element 12C in the third period and the fourth period in a similar manner, the Y-coordinate of the object matter Ob can be detected.

When obtaining the position information of the object matter Ob in the detection area 10R based on the detection result in the light detector 30 as described above, it is also possible to adopt a configuration of, for example, using a microprocessor unit (MPU) as the light source control section 145 and the position detection section 50, and thus executing a predetermined software (an operation program) by the microprocessor unit, thereby performing the process. Further, as described below with reference to FIGS. 5A and 5B, it is also possible to adopt a configuration of performing the process with a signal processing section using hardware such as a logic circuit.

Configuration Example of Position Detection Section 50

Figures 5A, 5B:
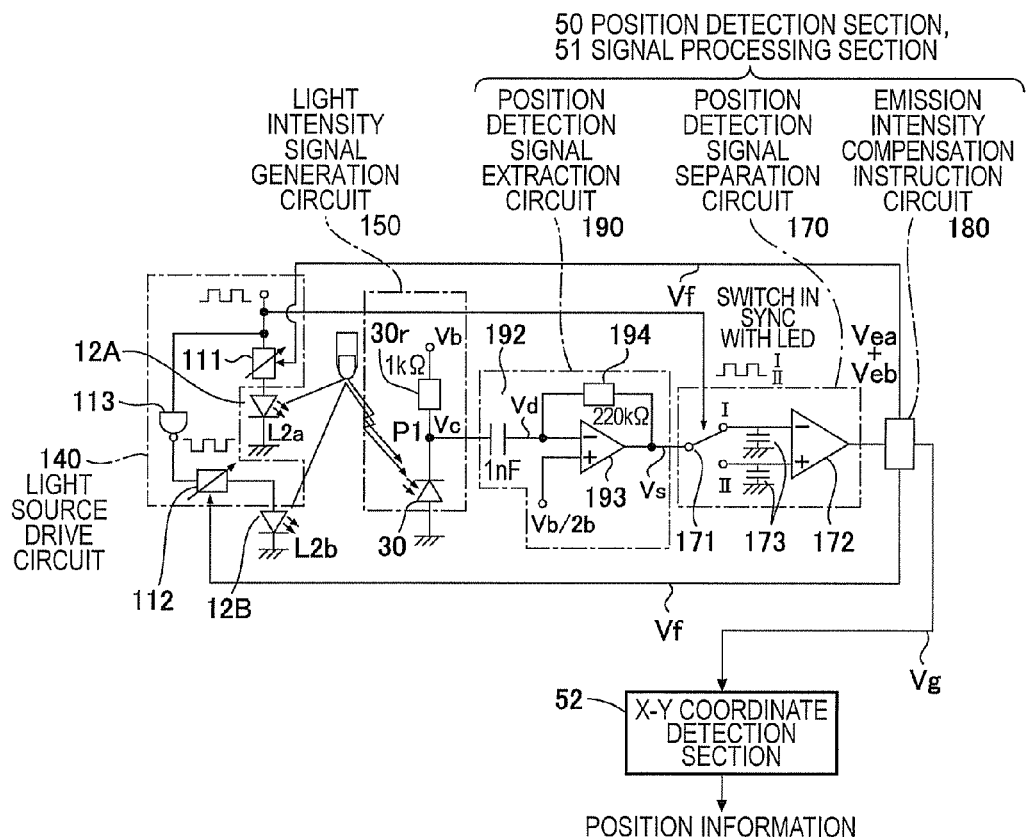
FIGS. 5A and 5B are explanatory diagrams showing the content of signal processing in the display device with a position detection function according to the first embodiment of the invention.

FIGS. 5A and 5B are explanatory diagrams showing a content of the signal processing in the display device 100 with a position detection function according to the first embodiment of the invention, wherein FIG. 5A is an explanatory diagram of the position detection section 50 of the display device 100 with a position detection function to which the invention is applied, and FIG. 5B is an explanatory diagram showing a content of the process in an emission intensity compensation instruction section of the position detection section 50. Among the methods explained above with reference to FIGS. 4A and 4B, the position detection section 50 described here adopts the method of detecting the X-coordinate of the object matter Ob based on the adjustment values or the control values when adjusting the control values (the drive current values) to the first light emitting element 12A and the second light emitting element 12B so that the detection values LXa, LXb in the light detector 30 in the first period and the second period, respectively. It should be noted that since the configurations for respectively detecting the X-coordinate and the Y-coordinate are substantially the same, the case of obtaining the X-coordinate will only be explained in the following description.

As shown in FIG. 5A, in the display device 100 with a position detection function according to this embodiment, the light source drive circuit 140 is represented as being arranged to apply a drive pulse with a predetermined current value to each of the plurality of light emitting elements 12 via a variable resistor 111 in the first period, and apply a drive pulse with a predetermined current value to each of the plurality of light emitting elements 12 via a variable resistor 112 and an inverting circuit 113 in the second period. Therefore, the light source drive circuit 140 is arranged to apply the drive pulses with phases reverse to each other to the light emitting elements 12 in the first period and the second period, respectively. Further, the light beam, which is the first position detection light beam L2a when forming the first X-coordinate detection intensity distribution L2Xa reflected by the object matter Ob, is received by the common light detector 30 in the first period, and the light beam, which is the second position detection light beam L2b when forming the second X-coordinate detection intensity distribution L2Xb reflected by the object matter Ob, is received by the common light detector 30 in the second period. In a light intensity signal generation circuit 150, a resistor 30r with a resistance of about 1 kΩ is electrically connected in series to the light detector 30, and a bias voltage Vb is applied between both ends thereof.

In the light intensity signal generation circuit 150, the position detection section 50 is electrically connected to a connection point P1 of the light detector 30 and the resistor 30r. A detection signal Vc output from the connection point P1 of the light detector 30 and the resistor 30r is expressed by the following formula.

$Vc = V30/(V30 + (\text{resistance value of the resistor } 30r))$ $V30$: an equivalent resistance of the light detector 30

Therefore, in comparison between the case in which the environment light does not enter the light detector 30 and the case in which the environment light enters the light detector 30, the level and the amplitude of the detection signal Vc become greater in the case in which the environment light enters the light detector 30.

The signal detection section 50 is substantially composed of a position detection signal extraction circuit 190, a position detection signal separation circuit 170, and an emission intensity compensation instruction circuit 180. It should be noted that the emission intensity compensation instruction circuit 180 also functions as a part of the light source control section 145 shown in FIG. 2.

The position detection signal extraction circuit 190 is provided with a filter 192 formed of a capacitor of about 1 nF, and the filter 192 functions as a high-pass filter for removing a direct-current component from the signal output from the connection point P1 of the light detector 30 and the resistor 30r. Therefore, due to the filter 192, a position detection signal Vd of the position detection light beams L2 detected by the light detector 30 in the first period and the second period can be extracted from the detection signal Vc output from the connection point P1 of the light detector 30 and the resistor 30r. Therefore, since the intensity of the environment light can be regarded as constant during a certain period of time while the position detection light beams L2 are modulated, the low-frequency component or the direct-current component caused by the environment light can be removed by the filter 192.

Further, the position detection signal extraction circuit 190 has an adder circuit 193 provided with a feedback resistor 194 of about 220 kΩ in the posterior stage of the filter 192, and the position detection signal Vd extracted by the filter 192 is output to the position detection signal separation circuit 170 as a position detection signal Vs obtained by superimposing the position detection signal Vd on a voltage V/2 half as large as a bias voltage Vb.

The position detection signal separation circuit 170 is provided with a switch 171 for performing a switching operation in sync with the drive pulse applied to the light emitting elements 12 in the first period, a comparator 172, and capacitors 173 electrically connected respectively to input lines of the comparator 172. Therefore, when the position detection signal Vs is input to the position detection signal separation circuit 170, the position detection signal separation circuit 170 outputs an effective value Vea of the position detection signal Vs in the first period and an effective value Veb of the position detection signal Vs in the second period alternately to the emission intensity compensation instruction circuit 180.

The emission intensity compensation instruction circuit 180 compares the effective values Vea, Veb with each other to perform the process shown in FIG. 5B, and outputs a control signal Vf to the light source drive circuit 140 so that the effective value Vea of the position detection signal Vs in the first period and the effective value Veb of the position detection signal Vs in the second period have the same level to thereby control the light source drive circuit 140. In other words, the emission intensity compensation instruction circuit 180 compares the effective value Vea of the position detection signal Vs in the first period and the effective value Veb of the position detection signal Vs in the second period with each other, and then keeps the resent drive condition if they are equal to each other. In contrast thereto, if the effective value Vea of the position detection signal Vs in the first period is lower than the effective value Veb of the position detection signal Vs in the second period, the emission intensity compensation instruction circuit 180 makes the resistance value of the variable resistor 111 be reduced to thereby increase the intensity of the light emitted from the first light emitting element 12A in the first period. Further, if the effective value Veb of the position detection signal Vs in the second period is lower than the effective value Vea of the position detection signal Vs in the first period, the emission intensity compensation instruction circuit 180 makes the resistance value of the variable resistor 112 be reduced to thereby increase the intensity of the light emitted from the second light emitting element 12B in the second period.

In such a manner as described above, the display device 100 with a position detection function controls the control value (the current value) of each of the first light emitting element 12A and the second light emitting element 12B using the emission intensity compensation instruction circuit 180 of the position detection section 50 so that the detection amounts by the light detector 30 in the first period and the second period become the same. Therefore, since the information regarding the control values to the light emitting elements 12, with which the effective value Vea of the position detection signal Vs in the first period and the effective value Veb of the position detection signal Vs in the second period have the same level, exists in the emission intensity compensation instruction circuit 180, by outputting the information to the X-Y coordinate detection section 52 as a position detection signal Vg, it is possible for the X-Y coordinate detection section 52 to obtain the X-coordinate of the object matter Ob in the detection area 10R. Further, by using the same principle, the X-Y coordinate detection section 52 can obtain the Y-coordinate of the object Ob in the detection area 10R.

Further, in the present embodiment, the filter 192 removes the direct-current component caused by the environment light from the detection signal Vc output from the connection point P1 of the light detector 30 and the resistor 30r to thereby extract the position detection signal Vd in the position detection signal extraction circuit 190. Therefore, even in the case in which the detection signal Vc output from the connection point P1 of the light detector 30 and the resistor 30r includes the signal component due to the infrared component of the environment light, the influence of such environment light can be canceled.

X-Y Coordinate Detection Operation

Figure 6A:
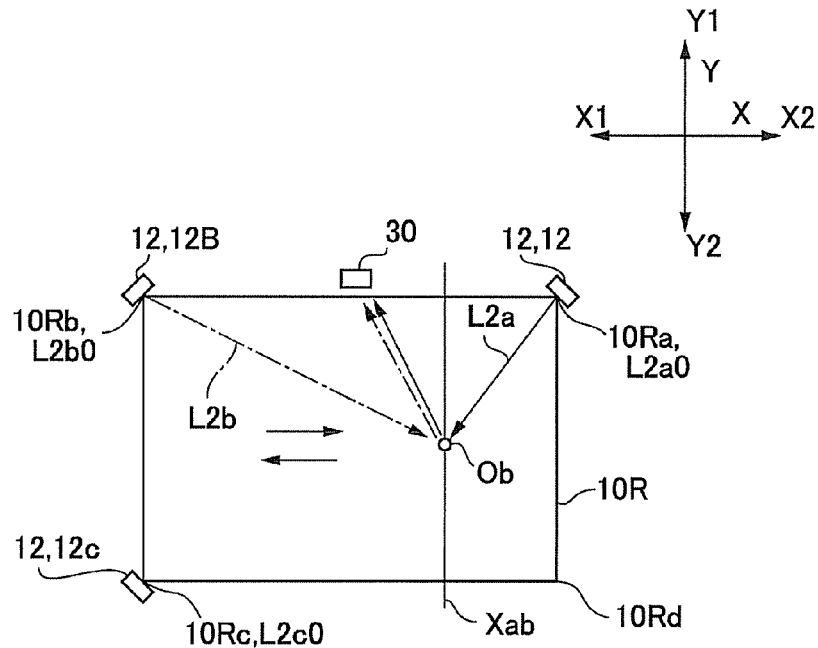
FIGS. 6A through 6C are explanatory diagrams showing the operation of detecting X-Y coordinate in the display device with a position detection function according to the first embodiment of the invention.
Figure 6B:
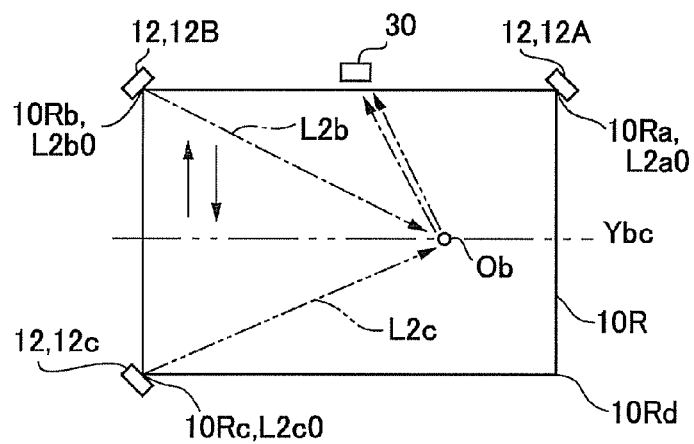
Figure 6C:
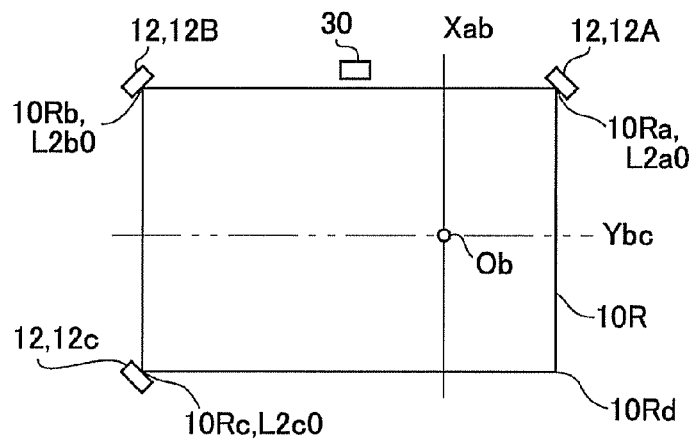

The operation of detecting the position of the object matter Ob in the detection area 10R in the display device 100 with a position detection function according to the present embodiment will specifically be explained with reference to FIGS. 1A, 1B, 3A through 3C, and 6A through 6C. FIGS. 6A through 6C are explanatory diagrams showing the operation of detecting the X-Y coordinate in the display device 100 with a position detection function according to the first embodiment of the invention.

In the display device 100 with a position detection function according to the present embodiment, in order to detect the X-Y coordinate of the object matter Ob in the detection area 10R, the X-coordinate is detected using the first period and the second period described below, and the Y-coordinate is detected using the third period and the fourth period.

In the display device 100 with a position detection function according to the present embodiment, in order to detect the X-coordinate of the object matter Ob in the detection area 10R, firstly, the first light emitting element 12A is lit while the second light emitting element 12B and the third light emitting element 12C are put off in the first period to thereby form the first intensity distribution L2$a$1 shown in FIG. 3A. Subsequently, in the second period, the second light emitting element 12B is lit while the first light emitting element 12A and the third light emitting element 12C are put off to thereby form the second intensity distribution L2$b$1 shown in FIG. 3B. If the detection value in the light detector 30 in the first period and the detection value in the light detector 30 in the second period are equal to each other as a result, it is understood that the distance from the highest intensity portion L2$a$0 of the first intensity distribution L2$a$1 shown in FIG. 3A to the object matter Ob and the distance from the highest intensity portion L2$b$0 of the second intensity distribution L2$b$1 to the object matter Ob are equal to each other.

In contrast thereto, in the case in which the detection value in the light detector 30 in the first period and the detection value in the light detector 30 in the second period are different from each other, the control values (the drive current values) to the first light emitting element 12A and the second light emitting element 12B are adjusted so that these detection values become equal to each other, and the first intensity distribution L2$a$1 is formed again in the first period, and the second intensity distribution L2$b$1 is formed again in the second period. If the detection value in the light detector 30 in the first period and the detection value in the light detector 30 in the second period become equal to each other as a result, then the ratio between the adjustment value of the control value to the first light emitting element 12A in the first period and the adjustment value of the control value to the second light emitting element 12B in the second period is obtained. Alternatively, the ratio between the control value to the first light emitting element 12A in the first period and the control value to the second light emitting element 12B in the second period when the detection value in the light detector 30 in the first period and the detection value in the light detector 30 in the second period become equal to each other is obtained. Since these ratios correspond to the ratio between the distance from the highest intensity portion L2$a$0 of the first intensity distribution L2$a$1 shown in FIG. 3A to the object matter Ob and the distance from the highest intensity portion L2$b$0 of the second intensity distribution L2$b$1 shown in FIG. 3B to the object matter Ob, it is understood that the object matter Ob exists on a line Xab shown in FIG. 6A.

Subsequently, in order to detect the Y-coordinate of the object matter Ob in the detection area 10R, firstly, the second light emitting element 12B is lit while the first light emitting element 12A and the third light emitting element 12C are put off in the third period to thereby form the second intensity distribution L2$b$1 shown in FIG. 3B. Subsequently, in the fourth period, the third light emitting element 12C is lit while the first light emitting element 12A and the second light emitting element 12B are put off to thereby form the third intensity distribution L2$c$1 shown in FIG. 3C. If the detection value in the light detector 30 in the third period and the detection value in the light detector 30 in the fourth period are equal to each other as a result, it is understood that the distance from the highest intensity portion L2$b$0 of the second intensity distribution L2$b$1 shown in FIG. 3B to the object matter Ob and the distance from the highest intensity portion L2c0 of the third intensity distribution L2c1 to the object matter Ob are equal to each other.

In contrast thereto, in the case in which the detection value in the light detector 30 in the third period and the detection value in the light detector 30 in the fourth period are different from each other, the control values (the drive current values) to the second light emitting element 12B and the third light emitting element 12C are adjusted so that these detection values become equal to each other, and the second intensity distribution L2b1 is formed again in the third period, and the third intensity distribution L2c1 is formed again in the fourth period. If the detection value in the light detector 30 in the third period and the detection value in the light detector 30 in the fourth period become equal to each other as a result, then the ratio between the adjustment value of the control value to the second light emitting element 12B in the third period and the adjustment value of the control value to the third light emitting element 12C in the fourth period is obtained. Further, the ratio between the control value to the second light emitting element 12B in the third period and the control value to the third light emitting element 12C in the fourth period when the detection value in the light detector 30 in the third period and the detection value in the light detector 30 in the fourth period become equal to each other is obtained. Since these ratios correspond to the ratio between the distance from the highest intensity portion L2b0 of the second intensity distribution L2b1 shown in FIG. 3B to the object matter Ob and the distance from the highest intensity portion L2c0 of the third intensity distribution L2c1 shown in FIG. 3C, it is understood that the object matter Ob exists on a line Ybc shown in FIG. 6B.

By obtaining the coordinate of the intersection of the lines Xab, Ybc as shown in FIG. 6C after obtaining the lines Xab, Ybc in such a manner as described above, the X-Y coordinate of the object matter Ob can be obtained.

It should be noted that although in the present embodiment the highest intensity portion L2a0 of the first intensity distribution L2a1, the highest intensity portion L2b0 of the second intensity distribution L2b1, and the highest intensity portion L2c0 of the third intensity distribution L2c1 exist at the corner portions 10Ra, 10Rb, and 10Rc of the detection area 10R, respectively, it is possible to obtain the X-Y coordinate of the object matter Ob using the method described above even if the highest intensity portions L2a0, L2b0, and L2c0 exist at other positions than described above. In other words, although in the present embodiment the highest intensity portions L2a0, L2b0, and L2c0 are located at the positions corresponding to the corners of the imaginary right triangles, it is also possible that the highest intensity portions L2a0, L2b0, and L2c0 are located at the positions corresponding to the corners of triangles other than right triangles. In either of the cases, it is only required that the highest intensity portions L2a0, L2b0, and L2c0 are not located on the same straight line. Further, although in the present embodiment the highest intensity portions L2a0, L2b0 are arranged on the X-axis, and the highest intensity portions L2b0, L2c0 are arranged on the Y-axis, the invention is not limited to such layout, but it is only required that the highest intensity portions L2a0, L2b0, and L2c0 are not located on the same straight line.

Major Advantages of Present Embodiment

As explained hereinabove, in the optical position detection device 10 according to this embodiment, the position detection light beams L2 (the first position detection light beam L2a, the second position detection light beam L2b, and the third position detection light beam L2c) are emitted from the light emitting elements 12 to the detection area 10R to form the intensity distributions of the position detection light beams L2 in the detection area 10R, and the light detector 30 detects the position detection light beams L3, which are the position detection light beams L2 reflected by the object matter Ob in the detection area 10R. Therefore, the position of the object matter Ob can be detected optically without disposing a number of light sources and light detectors around the detection area 10R.

Here, in the detection area 10R, there are emitted, as the position detection light beams L2, the first position detection light beam L2a with the first intensity distribution L2a1, the second position detection light beam L2b with the second intensity distribution L2b1 having the highest intensity portion L2b0 at a position shifted from the position of the highest intensity portion L2a0 of the first intensity distribution L2a1, and the third position detection light beam L2c with the third intensity distribution L2c1 having the highest intensity portion L2c0 at a position shifted from the imaginary straight line connecting the two highest intensity portions L2a0, L2b0. Therefore, by using two position detection light beams out of the first position detection light beam L2a, the second position detection light beam L2b, and the third position detection light beam L2c, and two position detection light beams of another combination, the position detection section 50 can detect the X-Y coordinate of the object matter Ob based on the reception result of the light detector 30. In other words, by comparing the intensity of the first position detection light beam L2a reflected by the object matter Ob and received by the light detector 30 and the intensity of the second position detection light beam L2b reflected by the object matter Ob and received by the light detector 30 with each other, and then comparing the intensity of the second position detection light beam L2b reflected by the object matter Ob and received by the light detector 30 and the intensity of the third position detection light beam L2c reflected by the object matter Ob and received by the light detector 30 with each other, the two-dimensional coordinate of the object matter Ob can be detected optically with a relatively simple configuration. Further, since the position detection light beams L2 are each formed of infrared light, there is an advantage that the position detection light beams L2 do not disturb the image display.

Further, in the first intensity distribution L2a1, the second intensity distribution L2b1, and the third intensity distribution L2c1, the intensity is monotonically reduced as the distance from the highest intensity portions L2a0, L2b0, and L2c0 increases. In particular in the present embodiment, in the first intensity distribution L2a1, the second intensity distribution L2b1, and the third intensity distribution L2c1, the intensity is monotonically reduced linearly or substantially linearly as the distance from the highest intensity portions L2a0, L2b0, and L2c0 increases. Therefore, since the relationship between the position of the object matter Ob and the intensity of the light received in the light detector 30 becomes relatively simple, the position of the object matter Ob can be detected with good accuracy with a relatively simple process.

Further, the position detection light source section 11 emits the first position detection light beam L2a, the second position detection light beam L2b, and the third position detection light beam L2c at respective timing different from each other. Therefore, even if the wavelengths of the first position detection light beam L2a, the second position detection light beam L2b, and the third position detection light beam L2c are equal to each other, the first position detection light beam L2a, the second position detection light beam L2b, and the third position detection light beam L2c can be detected by the same light detector 30, and therefore, simplification of the configuration can be achieved.

Further, the first light emitting element 12A, the second light emitting element 12B, and the third light emitting element 12C are each a light emitting diode, and emit infrared light beams made of a diverging light beam. Therefore, the position corresponding to the light axis becomes the highest intensity portion of the intensity distribution, and the intensity distribution in which the intensity is reduced monotonically as the distance from the highest intensity portion increases can easily be formed.

Second Embodiment

Figure 7A:
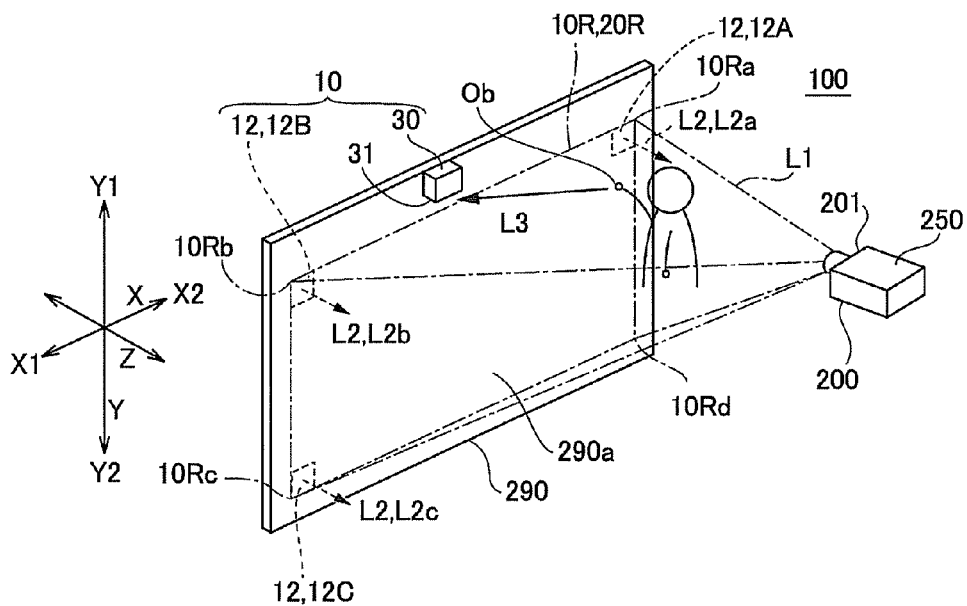
FIGS. 7A and 7B are explanatory diagrams schematically showing a configuration of an optical position detection device and a display device with a position detection function according to a second embodiment of the invention.
Figure 7B:
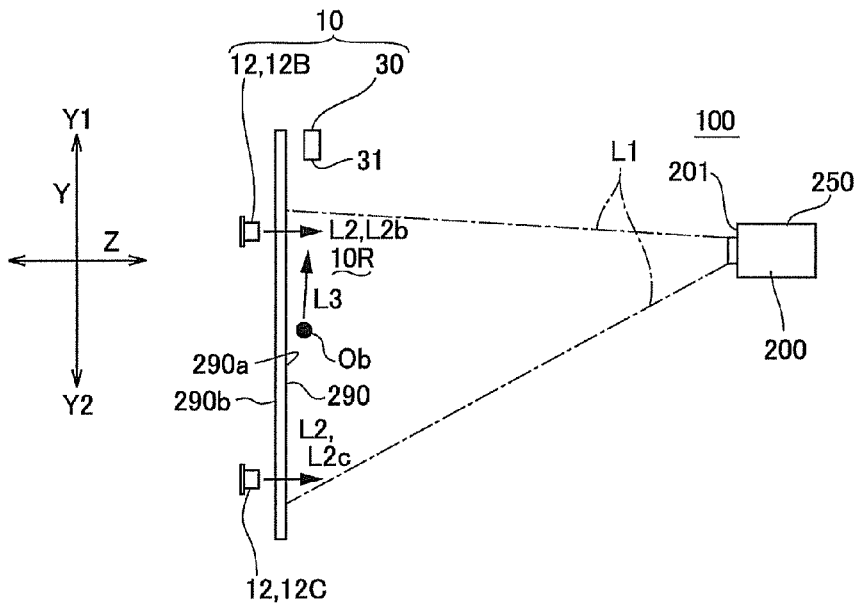

FIGS. 7A and 7B are explanatory diagrams schematically showing a configuration of an optical position detection device 10 and a display device 100 with a position detection function according to a second embodiment of the invention, wherein FIG. 7A is an explanatory diagram schematically showing an appearance of a substantial part of the display device 100 with a position detection function viewed from obliquely above, and FIG. 7B is an explanatory diagram schematically showing an appearance thereof viewed from a lateral side. It should be noted that since the basic configuration of the present embodiment is substantially the same as in the first embodiment, common parts are denoted with the same reference symbols and the explanation therefor will be omitted.

Although in the first embodiment, the light emitting elements 12 are disposed laterally to the detection area 10R on the side of the screen surface 290a of the screen member 290, in the present embodiment, as shown in FIGS. 7A and 7B, the light emitting elements 12 (the first light emitting element 12A, the second light emitting element 12B, and the third light emitting element 12C) are disposed on a reverse side 290b of the screen member 290, which is the side reverse to the screen surface 290a. In other words, the light emitting elements 12 (the first light emitting element 12A, the second light emitting element 12B, and the third light emitting element 12C) are disposed on the side reverse to the input operation side with respect to the detection area 10R.

Here, the light emitting elements 12 have the light axes oriented toward the detection area 10R via the screen member 290, and emit the position detection light beams L2 made of infrared light toward the detection area 10R. In other words, the screen member 290 is provided with a white screen on the side of the screen surface 290a, and the white screen is provided with translucency with respect to the position detection light beams L2 made of infrared light. It should be noted that the screen member 290 might be provided with a black light blocking layer formed on the reverse side of the screen in some cases with the purpose of improving the quality of the image displayed on the screen, and in such cases, by providing a plurality of translucent sections each formed of a fine hole to the light blocking layer, the screen member 290 can be arranged to have the translucency to the position detection light beams L2 made of infrared light.

Also in the present embodiment, the light detector 30 is formed of a light receiving element such as a photodiode or a phototransistor, and is disposed on the side of the screen surface 290a of the screen member 290 and outside the detection area 10R having a light receiving section 31 oriented in the direction along the screen surface 290a.

In the optical position detection device 10 having such a configuration as described above, the first light emitting element 12A, the second light emitting element 12B, and the third light emitting element 12C are disposed at positions facing the corner portions 10Ra, 10Rb, and 10Rc, and have light axes oriented toward the corner portions 10Ra, 10Rb, and 10Rc, respectively. Further, the first position detection light beam L2a emitted from the first light emitting element 12A, the second position detection light beam L2b emitted from the second light emitting element 12B, and the third position detection light beam L2c emitted from the third light emitting element 12C are all diverging light beams, and in these diverging light beams the intensity is the highest in the vicinities of the light axes L12a, L12b, and L12c, and is continuously lowered as the distances from the light axes L12a, L12b, and L12c increase.

Therefore, similarly to the case of the first embodiment, also in the present embodiment, the first position detection light beam L2a emitted from the first light emitting element 12A forms the first intensity distribution L2a1 shown in FIG. 3A in the detection area 10R. In the first intensity distribution L2a1, the highest intensity portion L2a0 of the first intensity distribution L2a1 appears in the corner portion 10Ra, and the intensity decreases monotonically as the distance from the highest intensity portion L2a0 increases. In the first intensity distribution L2a1 according to the present embodiment, the intensity decreases linearly or substantially linearly as the distance from the highest intensity portion L2a0 increases. Further, the second position detection light beam L2b emitted from the second light emitting element 12B forms the second intensity distribution L2b1 shown in FIG. 3B in the detection area 10R. In the second intensity distribution L2b1, the highest intensity portion L2b0 of the second intensity distribution L2b1 appears in the corner portion 10Rb, and the intensity decreases monotonically as the distance from the highest intensity portion L2b0 increases. In the second intensity distribution L2b1 according to the present embodiment, the intensity decreases linearly or substantially linearly as the distance from the highest intensity portion L2b0 increases. Further, the third position detection light beam L2c emitted from the third light emitting element 12C forms the third intensity distribution L2c1 shown in FIG. 3C in the detection area 10R. In the third intensity distribution L2c1, the highest intensity portion L2c0 of the third intensity distribution L2c1 appears in the corner portion 10Rc, and the intensity decreases monotonically as the distance from the highest intensity portion L2c0 increases. In the third intensity distribution L2c1 according to the present embodiment, the intensity decreases linearly or substantially linearly as the distance from the highest intensity portion L2c0 increases.

Here, the highest intensity portion L2a0 of the first intensity distribution L2a1 and the highest intensity portion L2b0 of the second intensity distribution L2b1 are shifted from each other in the X-axis direction. Further, the highest intensity portion L2c0 of the third intensity distribution L2c1 is located at a position not overlapping an imaginary line connecting the highest intensity portion L2b0 of the second intensity distribution L2b1 and the highest intensity portion L2a0 of the first intensity distribution L2a1. In other words, the highest intensity portion L2a0 of the first intensity distribution L2a1, the highest intensity portion L2b0 of the second intensity distribution L2b1, and the highest intensity portion L2c0 of the third intensity distribution L2c1 are located respectively at the corner portions of an imaginary triangle. Therefore, the first intensity distribution L2a1, the second intensity distribution L2b1, and the third intensity distribution L2c1 have intensity gradients with respective directions different from each other. Therefore, similarly to the case of the first embodiment, also in the optical position detection device 10 according to the present embodiment, the X-Y coordinate of the object matter Ob can be detected using the method explained with reference to FIGS. 4A, 4B, and 6A through 6C.

Third Embodiment

Figure 8A:
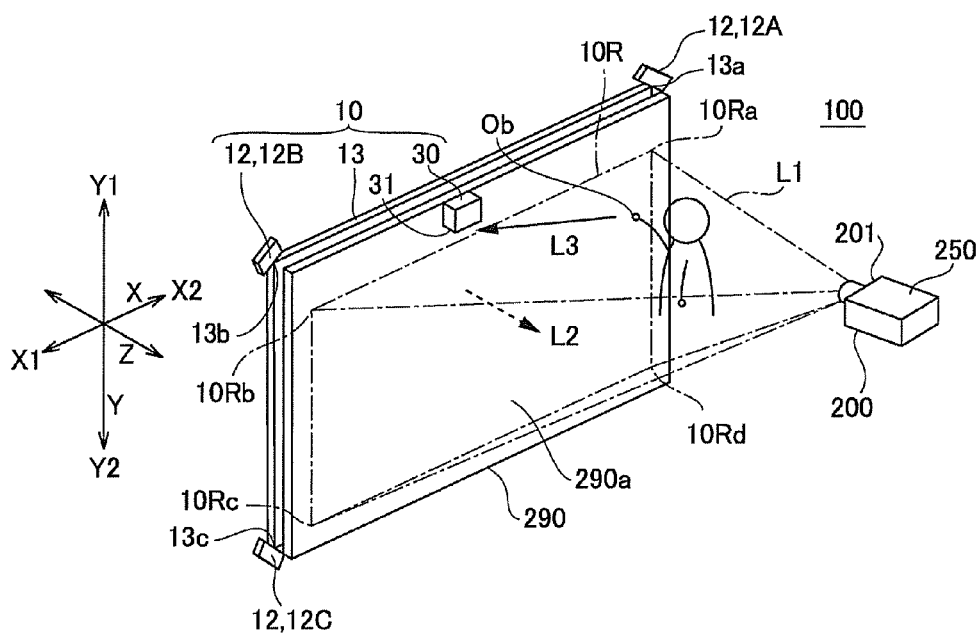
FIGS. 8A and 8B are explanatory diagrams schematically showing a configuration of an optical position detection device and a display device with a position detection function according to a third embodiment of the invention.
Figure 8B:
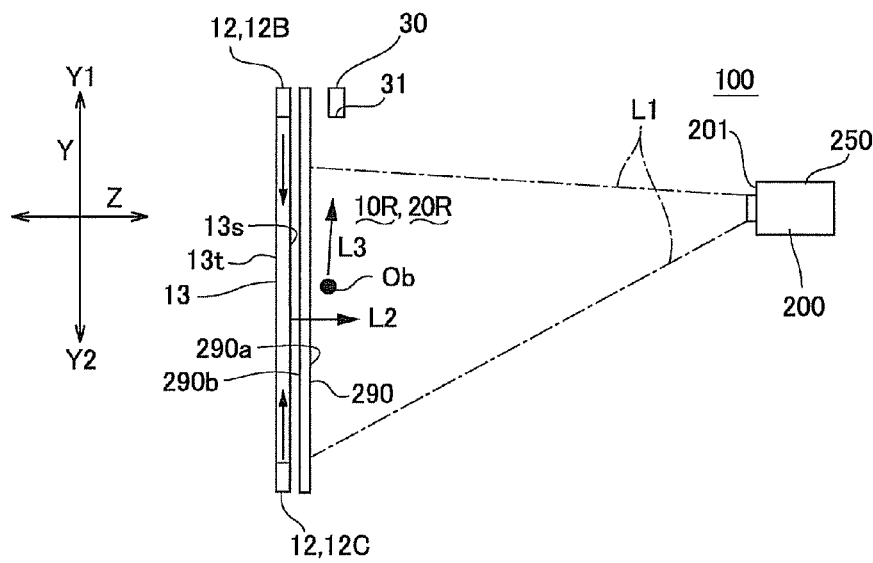
Figure 9A:
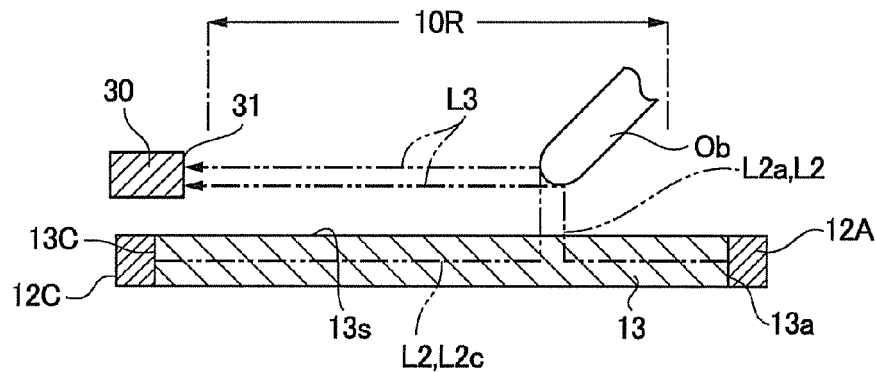
FIGS. 9A through 9C are explanatory diagrams of the optical position detection device according to the third embodiment of the invention.
Figure 9B:
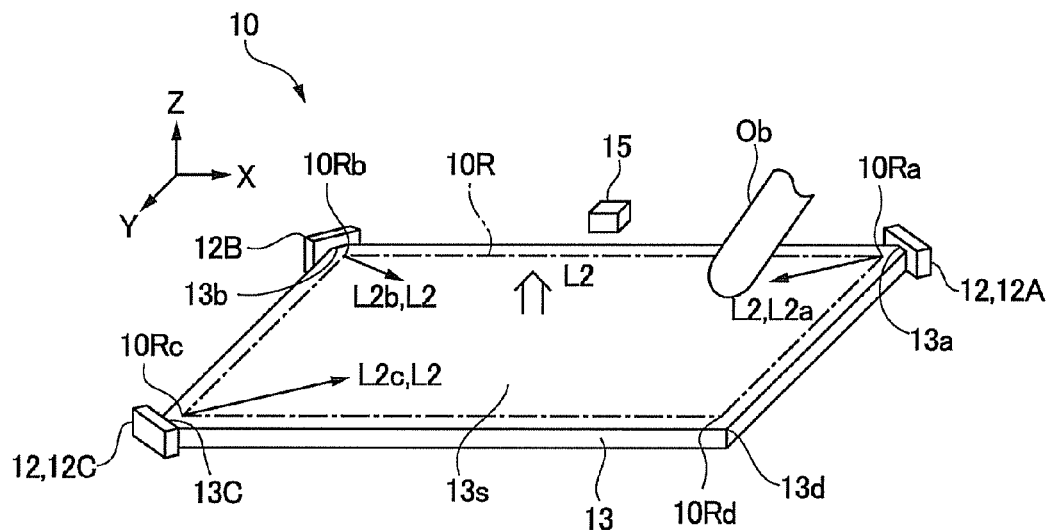
Figure 9C:
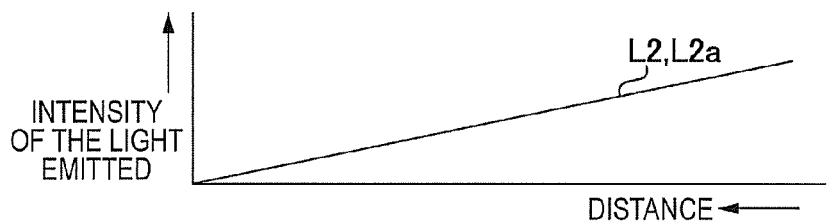

FIGS. 8A and 8B are explanatory diagrams schematically showing a configuration of an optical position detection device 10 and a display device 100 with a position detection function according to a third embodiment of the invention, wherein FIG. 8A is an explanatory diagram schematically showing an appearance of a substantial part of the display device 100 with a position detection function viewed from obliquely above, and FIG. 8B is an explanatory diagram schematically showing an appearance thereof viewed from a lateral side. FIGS. 9A through 9C are explanatory diagrams of the optical position detection device 10 according to the third embodiment of the invention, wherein FIG. 9A is an explanatory diagram schematically showing a cross-sectional configuration of the optical position detection device 10, FIG. 9B is an explanatory diagram showing a configuration of a light guide plate and so on used for the optical position detection device, and FIG. 9C is an explanatory diagram showing an attenuation condition of a position detection infrared light beam inside the light guide plate. It should be noted that since the basic configuration of the present embodiment is substantially the same as in the first embodiment, common parts are denoted with the same reference symbols and the explanation therefor will be omitted. Further, FIGS. 9A and 9B are described taking the Z-axis direction as the vertical direction.

Although in the first and second embodiments above, the light emitting elements 12 have the light axes oriented toward the detection area 10R, in the present embodiment, as explained with reference to FIGS. 9A through 9C, 10A, and 10B, there is used a light guide plate 13 made of a transparent resin plate such as polycarbonate or acrylic resin, and the light emitting elements 12 have the light axes oriented toward the detection area 10R. Therefore, the position detection light beams L2 emitted from the light emitting elements 12 are arranged to be emitted to the detection area 10R via the light guide plate 13.

More specifically, as shown in FIGS. 8A, 8B, and 9A through 9C, the optical position detection device 10 according to the present embodiment is provided with the light guide plate 13 having a substantially rectangular planar shape disposed on the reverse side 290$b$ of the screen member 290. In other words, the light guide plate 13 is disposed on the side reverse to the input operation side with respect to the detection area 10R. When viewed from the Z-axis direction, the light guide plate 13 has a substantially similar shape to the detection area 10R set in front of the screen member 290, and the corner portions 13$a$ through 13$d$ of the light guide plate 13 are located in substantially the same directions as the corner portions 10Ra through 10Rd of the detection area 10R.

Here, in the light guide plate 13, the surface thereof facing to the detection area 10R is a light emitting surface 13$s$, and the corner portions 10Ra through 10Rd are used as entrance sections of the position detection light beams L2 emitted from the light emitting elements 12. More specifically, the light emitting elements 12 (the first light emitting element 12A, the second light emitting element 12B, and the third light emitting element 12C) are disposed at positions facing the corner portions 13$a$, 13$b$, and 13$c$ of the light guide plate 13 having the light axes oriented toward the corner portions 13$a$, 13$b$, and 13$c$. Therefore, the light emitting elements 12 are disposed on the side reverse to the input operation side with respect to the detection area 10R. It should be noted that a rear surface 13$t$ or the light emitting surface 13$s$ of the light guide plate 13 is provided with a light scattering structure such as a surface relief structure, a prism structure, or a scattering layer (not shown), and therefore, according to such a light scattering structure, the light beams entering from the corner portions 13$a$, 13$b$, and 13$c$ and propagated inside thereof are gradually deflected and emitted from the light emitting surface 13$s$ as the light beams proceed along the propagation direction. It should be noted that in some cases an optical sheet such as a prism sheet or a light scattering plate is disposed on the light emission side of the light guide plate 13 in order to achieve equalization of the position detection light beams L2$a$ through L2$c$ if necessary.

Also in the present embodiment, the light detector 30 is formed of a light receiving element such as a photodiode or a phototransistor, and is disposed on the side of the screen surface 290$a$ of the screen member 290 and outside the detection area 10R having the light receiving section 31 oriented in the direction along the screen surface 290$a$.

In the optical position detection device 10 configured as described above, the position detection light beams L2 emitted from the light emitting elements 12 enter from the corner portions 13$a$ through 13$c$ of the light guide plate 13, and are then emitted from the light emitting surface 13$s$ while being propagated inside the light guide plate 13. Therefore, when the position detection light beams L2 emitted from the light emitting surface 13$s$ of the light guide plate 13 to the detection area 10R are reflected by the object matter Ob, the position detection light beams L3, which are the position detection light beams L2 reflected by the object matter Ob are detected by the light detector 30.

Here, the position detection light beams L2 emitted from the light emitting elements 12 enter from the corner portions 13$a$ through 13$c$ of the light guide plate 13, and are then emitted from the light emitting surface 13$s$ while being propagated inside the light guide plate 13. For example, the first position detection light beam L2$a$ emitted from the first light emitting element 12A is emitted from the light emitting surface 13$s$ while being propagated inside the light guide plate 13. On this occasion, the intensity of the first position detection light beam L2$a$ emitted from the light guide plate to the detection area 10R is attenuated linearly in accordance with the distance from the first light emitting element 12A as shown in FIG. 9C. The second position detection light beam L2$b$ emitted from the second light emitting element 12B and the third position detection light beam L2$c$ emitted from the third light emitting element 12C are also emitted from the light emitting surface 13$s$ while being attenuated in the same manner. Further, the first light emitting element 12A is disposed at the corner portion 13$a$ of the light guide plate 13, the second light emitting element 12B is disposed at the corner portion 13$b$ of the light guide plate 13, the third light emitting element 12C is disposed at the corner portion 13$c$ of the light guide plate 13.

Therefore, similarly to the case of the first embodiment, also in the present embodiment, the first position detection light beam L2$a$ emitted from the first light emitting element 12A forms the first intensity distribution L2$a$1 shown in FIG. 3A in the detection area 10R. In the first intensity distribution L2$a$1, the highest intensity portion L2$a$0 of the first intensity distribution L2$a$1 appears in the corner portion 10Ra of the detection area 10R, and the intensity decreases monotonically as the distance from the highest intensity portion L2$a$0 increases. In the first intensity distribution L2$a$1 according to the present embodiment, the intensity decreases linearly or substantially linearly as the distance from the highest intensity portion L2$a$0 increases. Further, the second position detection light beam L2b emitted from the second light emitting element 12B forms the second intensity distribution L2b1 shown in FIG. 3B in the detection area 10R. In the second intensity distribution L2b1, the highest intensity portion L2b0 of the second intensity distribution L2b1 appears in the corner portion 10Rb of the detection area 10R, and the intensity decreases monotonically as the distance from the highest intensity portion L2b0 increases. In the second intensity distribution L2b1 according to the present embodiment, the intensity decreases linearly or substantially linearly as the distance from the highest intensity portion L2b0 increases. Further, the third position detection light beam L2c emitted from the third light emitting element 12C forms the third intensity distribution L2c1 shown in FIG. 3C in the detection area 10R. In the third intensity distribution L2c1, the highest intensity portion L2c0 of the third intensity distribution L2c1 appears in the corner portion 10Rc of the detection area 10R, and the intensity decreases monotonically as the distance from the highest intensity portion L2c0 increases. In the third intensity distribution L2c1 according to the present embodiment, the intensity decreases linearly or substantially linearly as the distance from the highest intensity portion L2c0 increases.

Here, the highest intensity portion L2a0 of the first intensity distribution L2a1 and the highest intensity portion L2b0 of the second intensity distribution L2b1 are shifted from each other in the X-axis direction. Further, the highest intensity portion L2c0 of the third intensity distribution L2c1 is located at a position not overlapping an imaginary line connecting the highest intensity portion L2b0 of the second intensity distribution L2b1 and the highest intensity portion L2a0 of the first intensity distribution L2a1. In other words, the highest intensity portion L2a0 of the first intensity distribution L2a1, the highest intensity portion L2b0 of the second intensity distribution L2b1, and the highest intensity portion L2c0 of the third intensity distribution L2c1 are located respectively at the corner portions of an imaginary triangle. Therefore, the first intensity distribution L2a1, the second intensity distribution L2b1, and the third intensity distribution L2c1 have intensity gradients with respective directions different from each other. Therefore, similarly to the case of the first embodiment, also in the optical position detection device 10 according to the present embodiment, the X-Y coordinate of the object matter Ob can be detected using the method explained with reference to FIGS. 4A, 4B, and 6A through 6C.

Fourth Embodiment

Figure 10A:
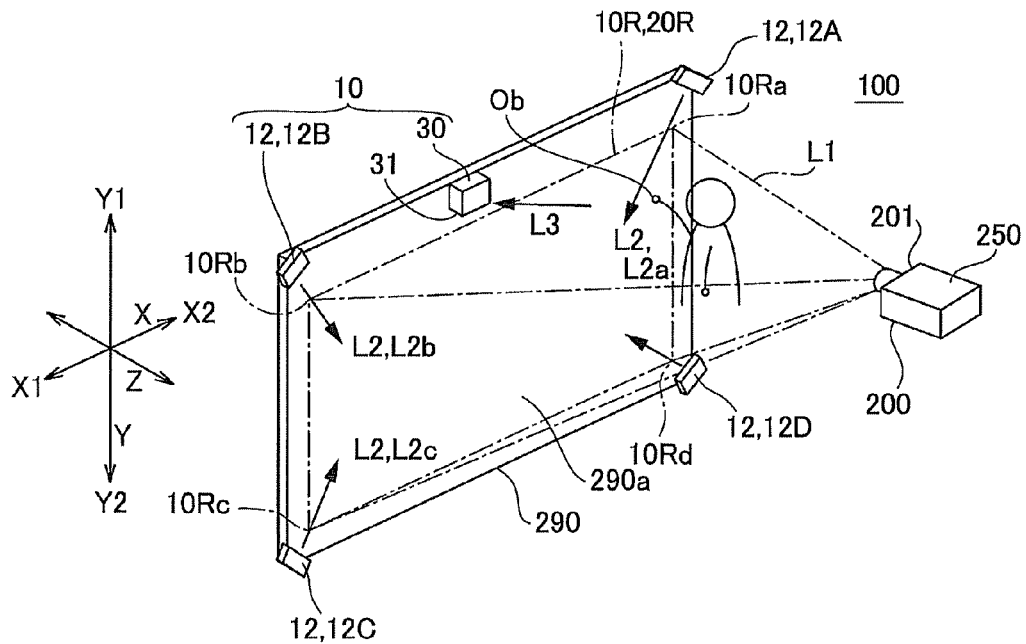
FIGS. 10A and 10B are explanatory diagrams schematically showing a configuration of an optical position detection device and a display device with a position detection function according to a fourth embodiment of the invention.
Figure 10B:
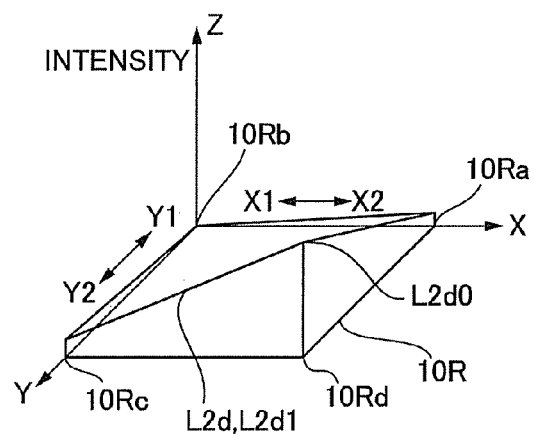

FIGS. 10A and 10B are explanatory diagrams schematically showing a configuration of an optical position detection device 10 and a display device 100 with a position detection function according to a fourth embodiment of the invention, wherein FIG. 10A is an explanatory diagram schematically showing an appearance of a substantial part of the display device 100 with a position detection function viewed from obliquely above, and FIG. 10B is an explanatory diagram showing the intensity distribution of a fourth position detection light beam. It should be noted that since the basic configuration of the present embodiment is substantially the same as in the first embodiment, common parts are denoted with the same reference symbols and the explanation therefor will be omitted.

Although in the first through third embodiments described above the first position detection light beam L2a, the second position detection light beam L2b, and the third position detection light beam L2c are emitted as the position detection light beams L2, in the present embodiment, as shown in FIG. 10A, the position detection light source section 11 is provided with a fourth light emitting element 12D for emitting a fourth position detection light beam L2d made of infrared light, and the fourth light emitting element 12D has the light axis oriented toward the corner portion 10Rd of the detection area 10R. Therefore, the position detection light beam L2d emitted from the position detection light source section 11 forms a fourth intensity distribution L2d1 having a highest intensity portion L2d0 at the corner portion 10Rd of the detection area 10R as shown in FIG. 10B. Also in the present embodiment, the light detector 30 is formed of a light receiving element such as a photodiode or a phototransistor, and is disposed on the side of the screen surface 290a of the screen member 290 and outside the detection area 10R having the light receiving section 31 oriented in the direction along the screen surface 290a.

In the optical position detection device 10 having such a configuration as described above, all of the first light emitting element 12A, the second light emitting element 12B, and the third light emitting element 12C are lit, and at the same time, the fourth light emitting element 12D is also lit. As a result, the first intensity distribution L2a1, the second intensity distribution L2b1, and the third intensity distribution L2c1 shown in FIGS. 3A through 3C, and the fourth intensity distribution L2d1 are combined with each other, and it is arranged that the position detection light beam having the intensity varying in the Z-axis direction is emitted. Therefore, by receiving the position detection light beam reflected by the object matter Ob with the light detector 30, the position detection section 50 can detect the Z-coordinate based on the detection result of the light detector 30. Therefore, the X-Y-Z coordinate of the object matter Ob can be detected optically with a relatively simple configuration.

Such detection of the Z-coordinate can be used for setting the predetermined range in the Z-axis direction in the detection area 10R as an effective detection area. For example, by setting the range within 5 cm from the surface of the screen member 290 as the effective detection area, if the object matter Ob is detected at a position with the distance from the surface of the screen member 290 exceeding 5 cm, the detection result can be invalidated. Therefore, the process of assuming the X-Y coordinate of the object matter Ob as an input only when the object matter Ob is detected within the range of no further than 5 cm from the surface of the screen member 290, for example, can be performed.

Fifth Embodiment

Figure 11A:
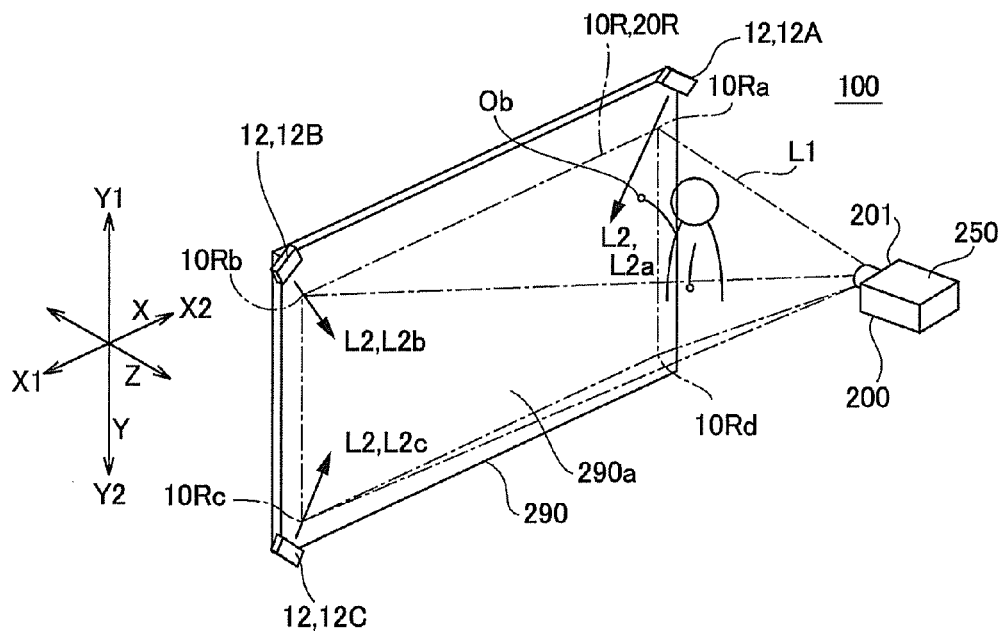
FIGS. 11A and 11B are explanatory diagrams schematically showing a configuration of an optical position detection device and a display device with a position detection function according to a fifth embodiment of the invention.
Figure 11B:
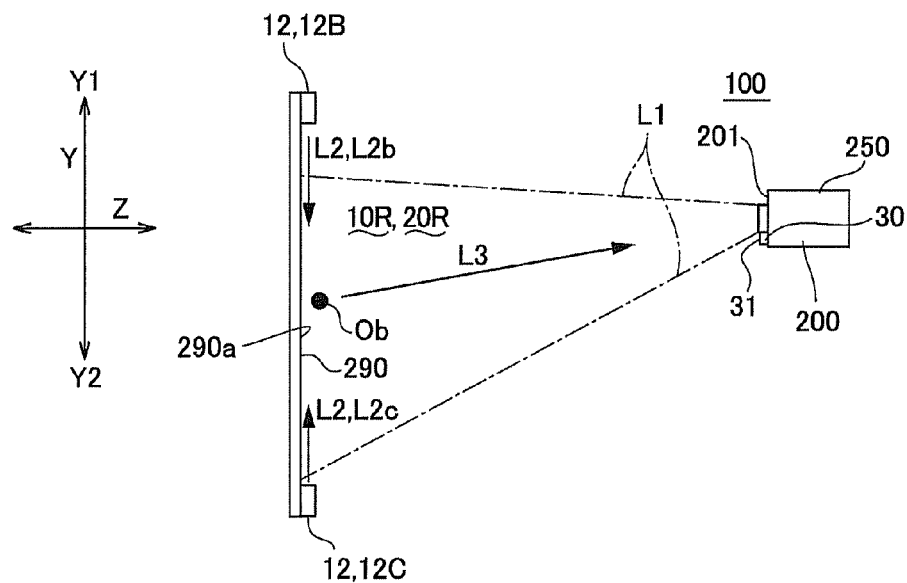

FIGS. 11A and 11B are explanatory diagrams schematically showing a configuration of an optical position detection device 10 and a display device 100 with a position detection function according to a fifth embodiment of the invention, wherein FIG. 11A is an explanatory diagram schematically showing an appearance of a substantial part of the display device 100 with a position detection function viewed from obliquely above, and FIG. 11B is an explanatory diagram schematically showing an appearance thereof viewed from a lateral side. It should be noted that since the basic configuration of the present embodiment is substantially the same as in the first embodiment, common parts are denoted with the same reference symbols and the explanation therefor will be omitted.

Although in the first embodiment described above, the light emitting elements 12 and the light detector 30 are disposed adjacent to the screen member 290, in the present embodiment, as shown in FIGS. 11A and 11B, the light detector 30 is disposed outside the screen surface 290a and has the light receiving section 31 facing to the screen surface 290a therefrom. More specifically, the light detector 30 is disposed at the front section 201 of the housing 250 of the image projection device 200. Therefore, the light detector 30 detects the position detection light beams L3 reflected by the object matter Ob toward the image projection device 200 out of the position detection light beams L2.

Therefore, in the display device 100 with a position detection function according to the present embodiment, the distance from the screen surface 290a in which the object matter Ob can be detected can be extended. Further, it is not required to dispose the light detector 30 separately from the image projection device 200. Further, the process for detecting the position of the object matter Ob can be performed on the side of the image projection device 200. Further, it is easy to reflect the position detection result of the object matter Ob to the image projected from the image projection device 200.

Other Embodiments

Although in the embodiments described above the first position detection light beam L2a, the second position detection light beam L2b, and the third position detection light beam L2c are emitted at respective timing different from each other, it is also possible to configure that the infrared light beams (the position detection light beams) with wavelengths different from each other are used as a part or the whole of the first position detection light beam L2a, the second position detection light beam L2b, and the third position detection light beam L2c, and the infrared light beams with the wavelengths different from each other are emitted simultaneously. In the case of realizing the configuration, it is enough to use a plurality of light detectors having the receiving wavelengths different from each other, and even if the infrared light beams with the wavelengths different from each other are emitted simultaneously, the infrared light beams can be received by such light detectors.

Modified Examples of Display Device 100 with Position Detection Function

Although in the embodiments described above there are described examples of applying the display device 100 with a position detection function to the projection display device or the electronic blackboard, by adopting a direct view display device as the image generation device as shown in FIGS. 12 through 15, it can be used for the electronic devices described later with reference to FIGS. 16A through 16C. It should be noted that although in the example described below the device according to the third embodiment is used, it is also possible to use the device according to the first, second, or fourth embodiment.

First Modified Example of Display Device 100 with Position Detection Function

Figure 12:
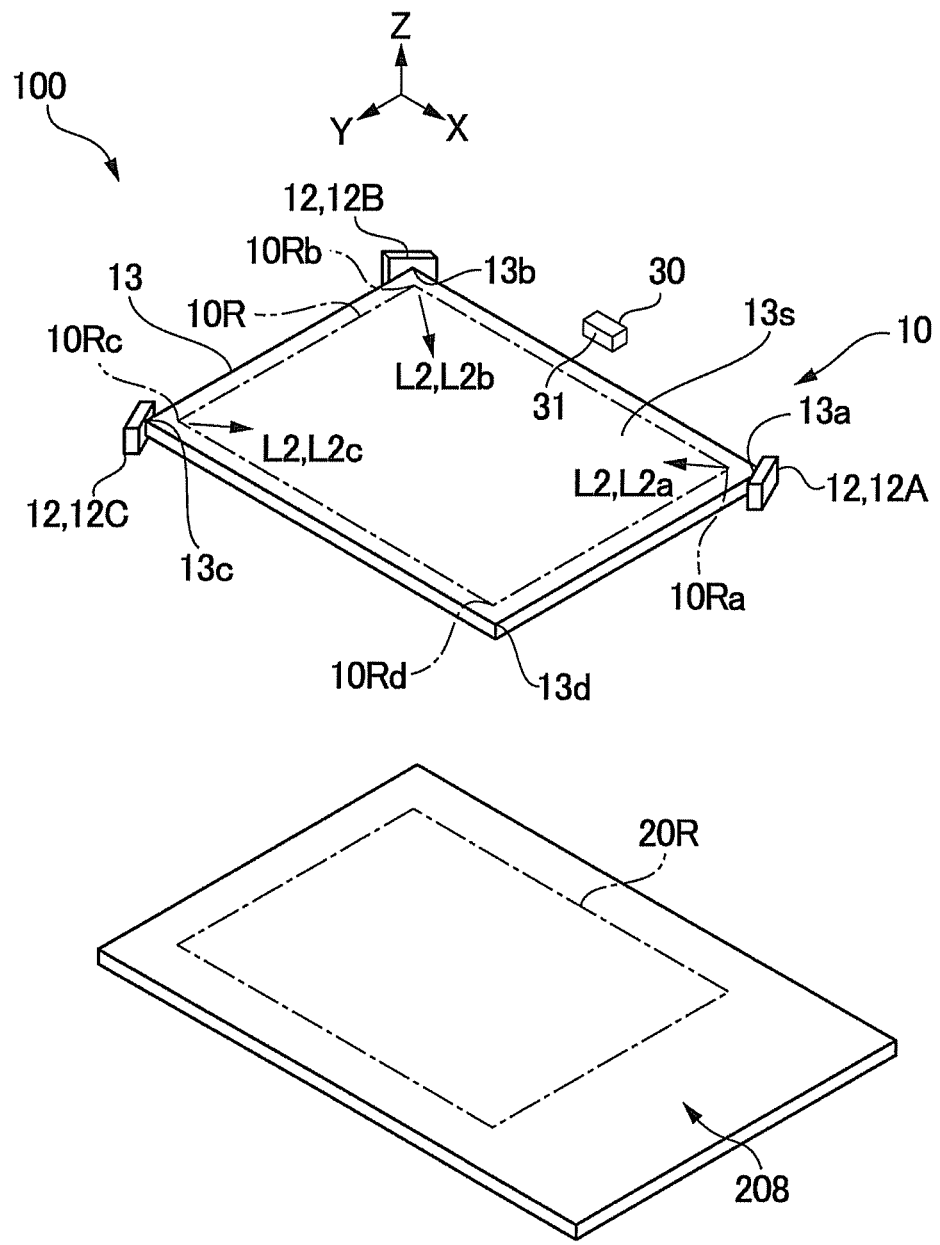
FIG. 12 is an exploded perspective view of an optical position detection device and a display device with a position detection function according to a first modified example of the invention.
Figure 13:
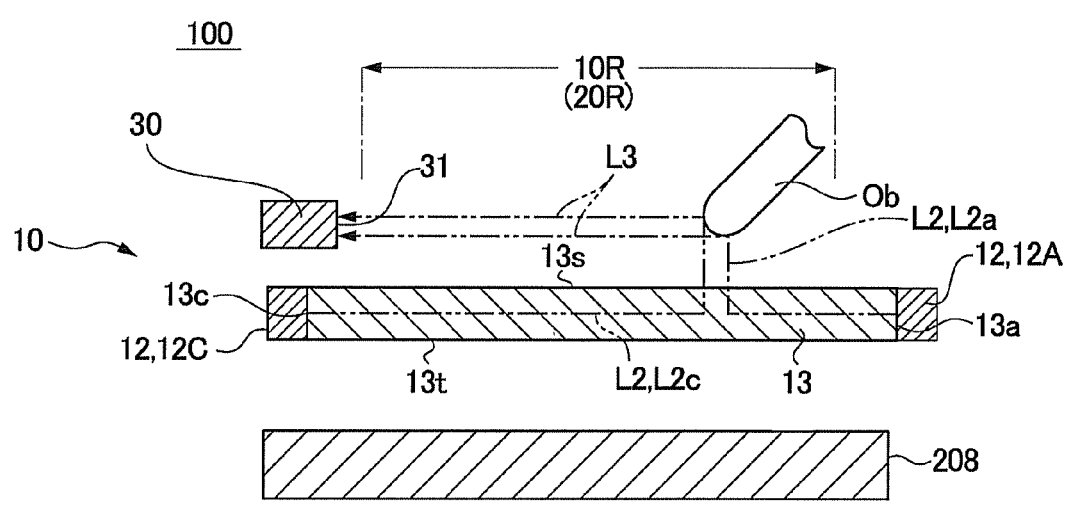
FIG. 13 is an explanatory diagram showing a cross-sectional configuration of the optical position detection device and the display device with a position detection function according to the first modified example of the invention.

FIG. 12 is an exploded perspective view of the optical position detection device 10 and the display device 100 with a position detection function according to the first modified example of the invention, and FIG. 13 is an explanatory diagram showing a cross-sectional configuration thereof. It should be noted that in the display device 100 with a position detection function according to the present example, since the configuration of the optical position detection device 10 is substantially the same as in the embodiment described above, the constituents common to the embodiment are denoted with the same reference symbols, and the explanation therefor will be omitted.

The display device 100 with a position detection function shown in FIGS. 12 and 13 is provided with the optical position detection device 10 and a direct view display device 208 (the image generation device), and the optical position detection device 10 is provided with the light emitting elements 12 for emitting the position detection light beams L2, the light guide plate 13, and the light detector 30 having the light receiving section 31 facing to the detection area 10R. The direct view display device 208 is, for example, an organic electroluminescence device or a plasma display device, and is disposed on the opposite side of the optical position detection device 10 to the input operation side. The direct view display device 208 is provided with the image display area 20R in a region overlapping the light guide plate 13 in a plan view, and the image display area 20R overlaps the detection area 10R in a plan view.

Second Modified Example of Display Device 100 with Position Detection Function

Figure 14:
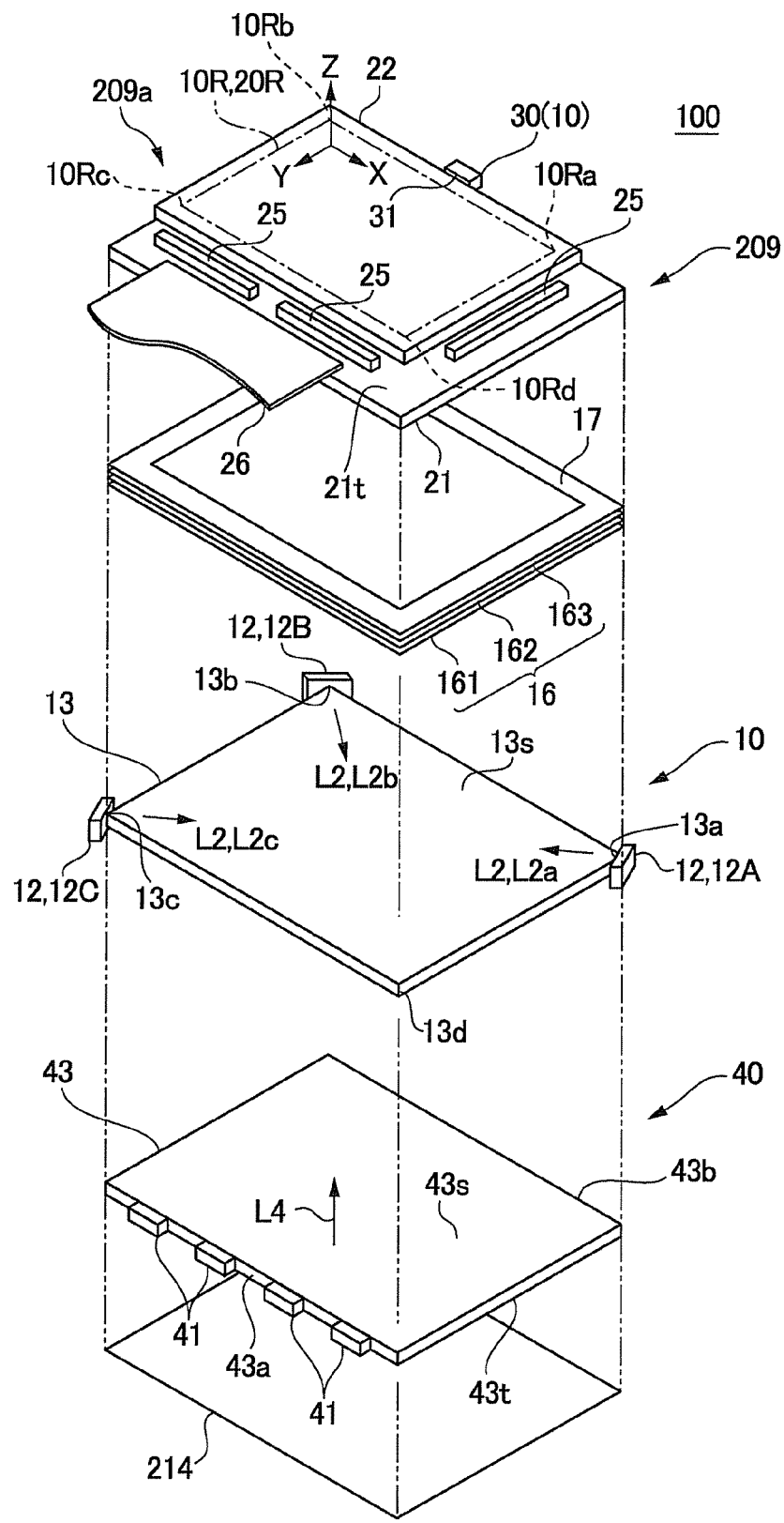
FIG. 14 is an exploded perspective view of an optical position detection device and a display device with a position detection function according to a second modified example of the invention.
Figure 15:
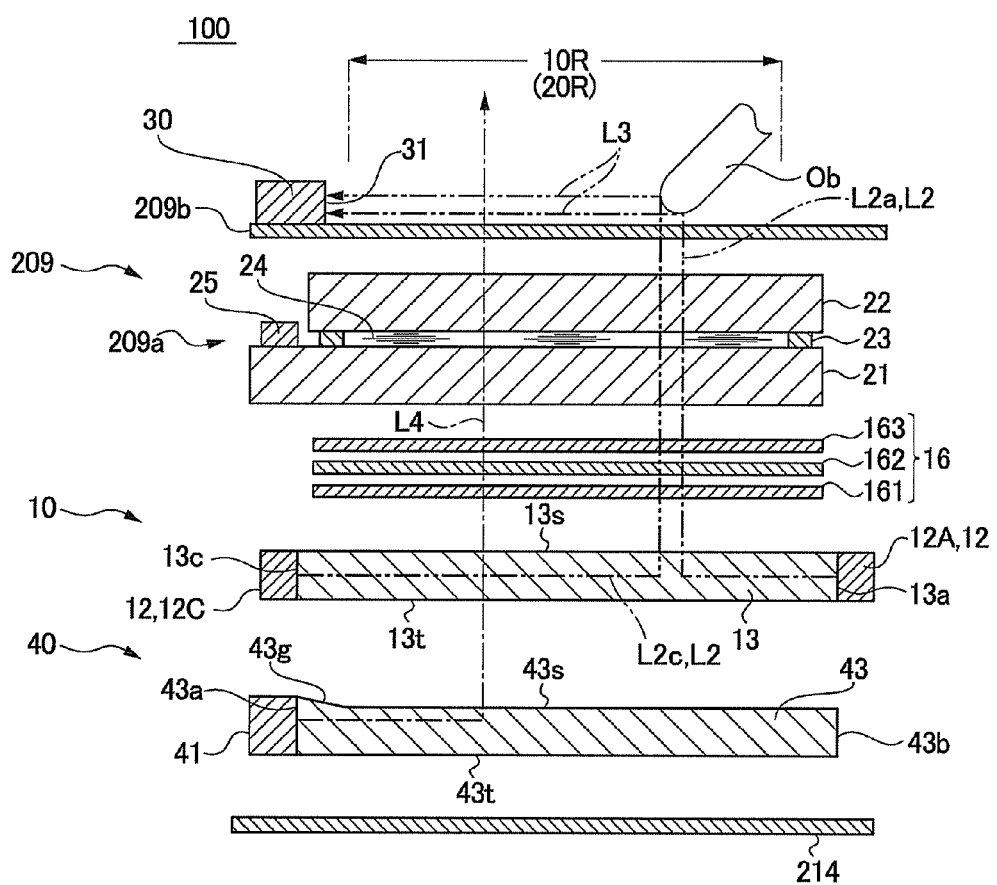
FIG. 15 is an explanatory diagram showing a cross-sectional configuration of the optical position detection device and the display device with a position detection function according to the second modified example of the invention.

FIGS. 14 and 15 are explanatory diagrams of the optical position detection device 10 and the display device 100 with a position detection function according to the second modified example of the invention, wherein FIG. 14 is an exploded perspective view of the optical position detection device 10 and the display device 100 with a position detection function and FIG. 15 is an explanatory diagram showing a cross-sectional configuration thereof. It should be noted that in the display device 100 with a position detection function according to the present example, since the configuration of the optical position detection device 10 is substantially the same as in the embodiment described above, the constituents common to the embodiment are denoted with the same reference symbols, and the explanation therefor will be omitted.

The display device 100 with a position detection function shown in FIGS. 14 and 15 is provided with the optical position detection device 10 and a liquid crystal device 209 (the direct view image generation device), and the optical position detection device 10 is provided with the light emitting elements 12 for emitting the position detection light beams L2, the light guide plate 13, and the light detector 30 having the light receiving section 31 facing to the detection area 10R. The liquid crystal device 209 is provided with a liquid crystal panel 209a and a translucent cover member 209b. The liquid crystal device 209 is provided with the image display area 20R in a region overlapping the light guide plate 13 in a plan view, and the image display area 20R overlaps the detection area 10R in a plan view.

In the display device 100 with a position detection function according to the present example, an optical sheet 16 for achieving equalization of the position detection light beams L2a through L2c is disposed on the light emission side of the light guide plate 13 if necessary. In the present example, as the optical sheet 16, there are used a first prism sheet 161 opposed to the light emitting surface 13s of the light guide plate 13, a second prism sheet 162 opposed to the first prism sheet 161 on the side opposite to the side on which the light guide plate 13 is located, and a light scattering plate 163 opposed to the second prism sheet 162 on the side opposite to the side on which the light guide plate 13 is located. It should be noted that on the side of the optical sheet 16 opposite to the side on which the light guide plate 13 is located, there is disposed a rectangular frame shaped light blocking sheet 17 in the periphery of the optical sheet 16. The light blocking sheet 17 prevents the position detection light beams L2a though L2c emitted from the position detection light sources 12A through 12C from leaking.

The liquid crystal device 209 has the liquid crystal panel 209a disposed on the side of the optical sheet 16 (the first prism sheet 161, the second prism sheet 162, and the light scattering plate 163) opposite to the side on which the light guide plate 13 is located. In the present example, the liquid crystal panel 209a is a transmissive liquid crystal panel, and has a structure obtained by bonding two translucent substrates 21, 22 with a seal member 23 and filling the gap between the substrates with a liquid crystal 24. In the present example, the liquid crystal panel 209a is an active matrix liquid crystal panel, and one of the two translucent substrates 21, 22 is provided with translucent pixel electrodes, data lines, scan lines, and pixel switching elements (not shown) while the other thereof is provided with a translucent common electrode (not shown). It should be noted that it is also possible to form the pixel electrodes and the common electrode on the same substrate. In the liquid crystal panel 209a, when a scan signal is output to each of the pixels via the scan lines, and an image signal is output via the data lines, the orientation of the liquid crystal 24 is controlled in each of the plurality of pixels, and as a result, an image is formed in the image display area 20R.

In the liquid crystal panel 209a, one 21 of the translucent substrates 21, 22 is provided with a substrate projection 21t projecting toward the periphery from the contour of the other 22 of the translucent substrates 21, 22. On the surface of the substrate projection 21t, there is mounted an electronic component 25 constituting the drive circuit and so on. Further, to the substrate projection 21t, there is connected a wiring member 26 such as a flexible printed circuit board (FPC). It should be noted that it is also possible to mount only the wiring member 26 on the substrate projection 21t. It should also be noted that a polarization plate (not shown) is disposed on the outer surface of the translucent substrates 21, 22 if necessary.

Here, in order to detect the two-dimensional position of the object matter Ob, it is necessary to emit the position detection light beams L2 toward the viewing side on which an operation with the object matter Ob is performed, and the liquid crystal panel 209a is disposed on the viewing side (operation side) of the light guide plate 13 and the optical sheet 16. Therefore, in the liquid crystal panel 209a, the image display area 20R is configured so as to be able to transmit the position detection light beams L2. It should be noted that in the case in which the liquid crystal panel 209a is disposed on the opposite side of the light guide plate 13 to the viewing side, although the image display area 20R is not required to be configured to transmit the position detection light beams L2, it is required to adopt a configuration that the image display area 20R can be viewed from the viewing side through the light guide plate 13 instead.

The liquid crystal device 209 is provided with an illumination device 40 for illuminating the liquid crystal panel 209a. In the present example, the illumination device 40 is disposed between the light guide plate 13 and a reflecting plate 214 on the side of the light guide plate 13 opposite to the side on which the liquid crystal panel 209a is located. The illumination device 40 is provided with an illumination light source 41, and an illumination light guide plate 43 for emitting the illumination light emitted from the illumination light source 41 and propagating it through the illumination light guide plate 43, and the illumination light guide plate 43 has a rectangular planar shape. The illumination light source 41 is formed of a light emitting element such as a light emitting diode (LED), and emits a white illumination light L4, for example, in accordance with a drive signal output from a drive circuit (not shown). In the present example, a plurality of illumination light sources 41 are arranged along a side portion 43a of the illumination light guide plate 43.

The illumination light guide plate 43 is provided with a tilted surface 43g disposed on the surface of the light emission side adjacent to the side portion 43a (in the outer periphery of a light emitting surface 43s on the side of the side portion 43a), and the illumination light guide plate 43 has a thickness gradually increasing toward the side portion 43a. Due to the light entrance structure having the tilted surface 43g, the height of the side portion 43a is made to correspond to the height of the light emitting surface of the illumination light source 41 while suppressing increase in thickness of the portion to which the light emitting surface 43s is provided.

In the illumination device 40, the illumination light emitted from the illumination light sources 41 enters inside the illumination light guide plate 43 from the side portion 43a of the illumination light guide plate 43, and is then propagated through the illumination light guide plate 43 toward an outer end portion 43b on the opposite side, and then emitted from the light emitting surface 43s. Here, the illumination light guide plate 43 has a light guide structure in which the light intensity ratio of the light emitted from the light emitting surface 43s to the light propagated through the illumination light guide plate 43 increases monotonically along a propagation direction from the side portion 43a toward the outer end portion 43b on the opposite side. Such a light guide structure can be realized by gradually increasing, for example, the area of a refracting surface with a fine concavo-convex shape for deflecting light or scattering light provided to the light emitting surface 43s or a back surface 43t of the illumination light guide plate 43, or a formation density of a scattering layer printed thereon toward the internal propagation direction described above. By providing such a light guide structure as described above, the illumination light L4 entering from the side portion 43a is emitted from the light emitting surface 43s in a roughly uniform manner.

In the present example, the illumination light guide plate 43 is disposed so as to overlap the image display area 20R of the liquid crystal panel 209a two-dimensionally on the side opposite to the viewing side of the liquid crystal panel 209a, and functions as a so-called backlight. It should be noted that it is also possible to dispose the illumination light guide plate 43 on the viewing side of the liquid crystal panel 209a so that the illumination light guide plate 43 functions as a so-called frontlight. Further, although in the present example the illumination light guide plate 43 is disposed between the light guide plate 13 and the reflecting plate 214, it is also possible to dispose the illumination light guide plate 43 between the optical sheet 16 and the light guide plate 13. Further, the illumination light guide plate 43 and the light guide plate 13 can be configured as a common light guide plate. Further, in the present example, the optical sheet 16 is commonly used for the position detection light beams L2a through L2c and the illumination light L4. It should be noted that it is possible to dispose a dedicated optical sheet separately from the optical sheet 16 described above on the light emission side of the illumination light guide plate 43. This is because, although in the illumination light guide plate 43 there is often used a light scattering plate providing a sufficient light scattering action in order to equalize the planar luminance of the illumination light L4 emitted from the light emitting surface 43s, if the position detection light beams L2a through L2c emitted from the light emitting surface 13s are scattered significantly in the light guide plate 13 for the position detection, the position detection is disturbed. Therefore, since it is required to eliminate the light scattering plate or to use the light scattering plate providing a relatively mild light scattering action, it is preferable to use the light scattering plate dedicated to the illumination light guide plate 43. It should be noted that the optical sheet having a light collection function such as a prism sheet (the first prism sheet 161 or the second prism sheet 162) can be used commonly.

Installation Example to Electronic Device

Electronic devices to which the display device 100 with a position detection function explained with reference to FIGS. 12 through 15 will be explained with reference to FIGS. 16A through 16C. FIGS. 16A through 16C are explanatory diagrams of the electronic devices using the display device with a position detection function according to an aspect of the invention. FIG. 16A shows a configuration of a mobile type personal computer equipped with the display device 100 with a position detection function. A personal computer 2000 is provided with the display device 100 with a position detection function as a display unit and a main body section 2010. The main body section 2010 is provided with a power switch 2001 and a keyboard 2002. FIG. 16B shows a configuration of a cellular phone equipped with the display device 100 with a position detection function. A cellular phone 3000 is provided with a plurality of operation buttons 3001, scroll buttons 3002, and the display device 100 with a position detection function as a display unit. The screen displayed on the display device 100 with a position detection function is scrolled by operating the scroll buttons 3002. FIG. 16C shows a configuration of a personal digital assistant (PDA) to which the display device 100 with a position detection function is applied. A personal digital assistant 4000 is provided with a plurality of operation buttons 4001, a power switch 4002, and the display device 100 with a position detection function as a display unit. When operating the power switch 4002, various kinds of information such as an address list or a date book are displayed on the display device 100 with a position detection function.

Figure 16A:
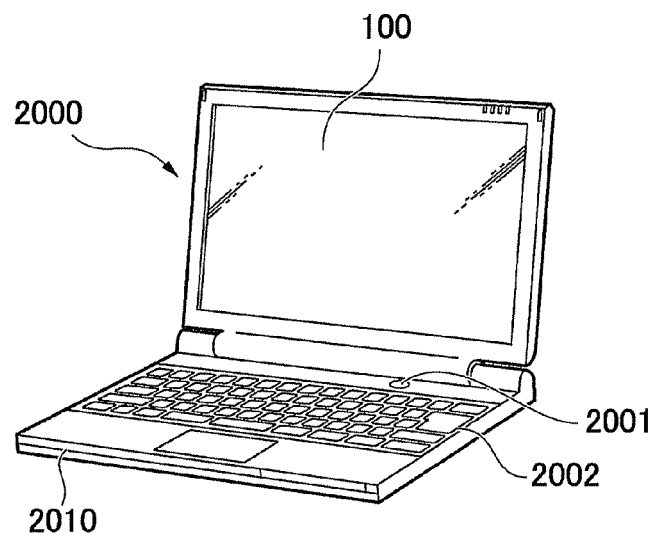
FIGS. 16A through 16C are explanatory diagrams of electronic devices using the display device with a position detection function according to an embodiment of the invention.
Figure 16B:
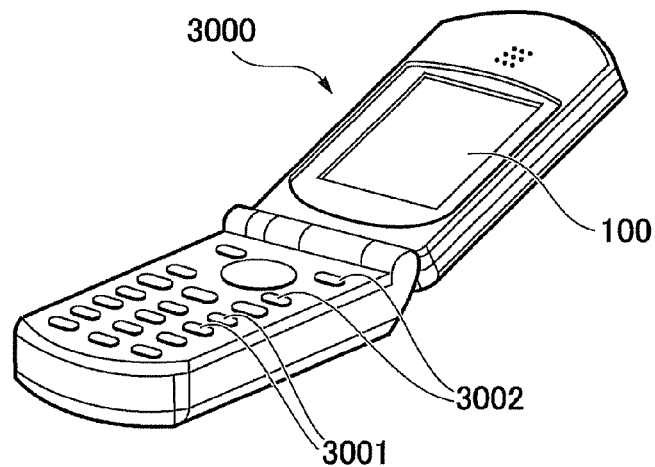
Figure 16C:
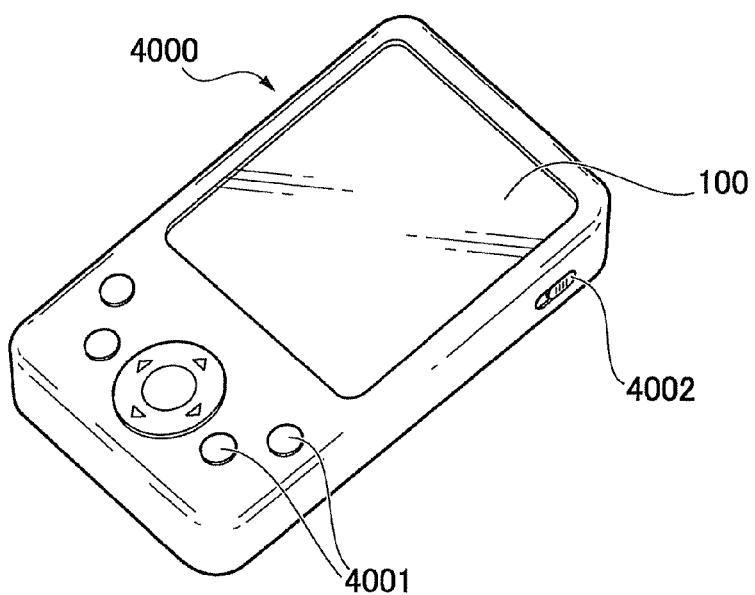

It should be noted that as an electronic device to which the display device 100 with a position detection function is applied, an electronic device such as a digital still camera, a liquid crystal television, a video cassette recorder of either a view finder type or a direct-view monitor type, a car navigation system, a pager, an electronic organizer, a calculator, a word processor, a workstation, a video phone, a POS terminal, or a banking terminal can be cited besides the devices shown in FIGS. 16A through 16C. Further, as the display section of these various types of electronic devices, the display device 100 with a position detection function described above can be applied.

The entire disclosure of Japanese Patent Application No. 2009-245195, filed Oct. 26, 2009 is expressly incorporated by reference herein.

What is claimed is:

1. An optical position detection device adapted to detect a position of an object matter in a detection area, comprising:
a first light source adapted to emit a first position detection light beam to the detection area to form a first intensity distribution of the first position detection light beam in the detection area;
a second light source adapted to emit a second position detection light beam to the detection area to form a second intensity distribution in the detection area, the second intensity distribution having a highest intensity portion at a position shifted from a highest intensity portion of the first intensity distribution;
a third light source adapted to emit a third position detection light beam to the detection area to form a third intensity distribution in the detection area, the third intensity distribution having a highest intensity portion at a position shifted from an imaginary straight line connecting the highest intensity portion of the first intensity distribution and the highest intensity portion of the second intensity distribution;
a light detector adapted to detect the first position detection light beam, the second position detection light beam, and the third position detection light beam, reflected by the object matter in the detection area; and
a position detection section adapted to detect a two-dimensional coordinate of the object matter in a detection plane set in the detection area, based on a result of comparison between an intensity of the first position detection light beam received by the light detector and an intensity of the second position detection light beam received by the light detector, and a result of comparison between an intensity of the second position detection light beam received by the light detector and an intensity of the third position detection light beam received by the light detector.

2. The optical position detection device according to claim 1, wherein
in each of the first intensity distribution, the second intensity distribution, and the third intensity distribution, the intensity decreases monotonically as distance from the highest intensity portion increases.

3. The optical position detection device according to claim 1, wherein
the first light source, the second light source, and the third light source emit the first position detection light beam, the second position light beam, and the third position detection light beam at respective timing different from each other.

4. The optical position detection device according to claim 1, wherein
the first position detection light beam, the second position detection light beam, and the third position detection light beam are each made of infrared light.

5. The optical position detection device according to claim 1, wherein
the first light source, the second light source, and the third light source emit the first position detection light beam, the second position detection light beam, and the third position detection light beam as diverging light beams.

6. The optical position detection device according to claim 1, wherein
the first light source, the second light source, and the third light source are disposed with light axes oriented toward the detection area.

7. The optical position detection device according to claim 1, further comprising:
a light guide plate having a light emitting surface facing to the detection area,
wherein the first position detection light beam, the second position detection light beam, and the third position detection light beam are emitted to the detection area via the light guide plate.

8. The optical position detection device according to claim 1, further comprising:
a fourth light source adapted to emit a fourth position detection light beam to form a intensity distribution, in which the intensity varies in a direction perpendicular to the detection plane, together with the first position detection light beam, the second position detection light beam, and the third position detection light beam.

9. A display device with a position detection function, comprising:
the optical position detection device according to claim 1; and
an image generation device adapted to form an image in an area overlapping the detection area.

10. An optical position detection device adapted to detect a position of an object matter in a detection area, comprising:
- a light detector operable to detect:
  - a first position detection light beam having a first intensity distribution in the detection area;
  - a second position detection light beam having a second intensity distribution in the detection area, the second intensity distribution having a highest intensity portion at a position shifted from a highest intensity portion of the first intensity distribution;
  - a third position detection light beam having a third intensity distribution in the detection area, the third intensity distribution having a highest intensity portion at a position shifted from an imaginary straight line connecting the highest intensity portion of the first intensity distribution and the highest intensity portion of the second intensity distribution; and
- a position detection section adapted to detect a two-dimensional coordinate of the object matter in a detection plane set in the detection area, based on a result of comparison between an intensity of the first position detection light beam received by the light detector and an intensity of the second position detection light beam received by the light detector, and a result of comparison between an intensity of the second position detection light beam received by the light detector and an intensity of the third position detection light beam received by the light detector.

11. The optical position detection device according to claim 10, wherein in each of the first intensity distribution, the second intensity distribution, and the third intensity distribution, the intensity decreases monotonically as distance from the highest intensity portion increases.

12. The optical position detection device according to claim 10, wherein the first position detection light beam, the second position detection light beam, and the third position detection light beam are each made of infrared light.

13. A display device with a position detection function, comprising:
- the optical position detection device according to claim 10; and
- an image generation device adapted to form an image in an area overlapping the detection area.

* * * * *